(12) United States Patent
Fujisaki et al.

(10) Patent No.: US 9,985,545 B2
(45) Date of Patent: May 29, 2018

(54) DC-TO-DC CONVERTER, POWER CONVERTER, POWER GENERATION SYSTEM, AND METHOD FOR DC-TO-DC CONVERSION

(71) Applicant: Kabushiki Kaisha Yaskawa Denki, Kitakyushu-shi (JP)

(72) Inventors: Seiji Fujisaki, Kitakyushu (JP); Sadao Ishii, Kitakyushu (JP); Kozo Ide, Kitakyushu (JP)

(73) Assignee: KABUSHIKI KAISHA YASKAWA DENKI, Kitakyushu-shi (JP)

( * ) Notice: Subject to any disclaimer, the term of this patent is extended or adjusted under 35 U.S.C. 154(b) by 0 days. days.

(21) Appl. No.: 15/649,792

(22) Filed: Jul. 14, 2017

(65) Prior Publication Data

US 2017/0310229 A1    Oct. 26, 2017

Related U.S. Application Data

(63) Continuation of application No. PCT/JP2015/053277, filed on Feb. 5, 2015.

(51) Int. Cl.
*H02M 3/335* (2006.01)
*H02M 3/337* (2006.01)

(52) U.S. Cl.
CPC ..... *H02M 3/33576* (2013.01); *H02M 3/3376* (2013.01); *H02M 3/33507* (2013.01)

(58) Field of Classification Search
CPC .................. H02M 3/33576; H02M 3/33507
See application file for complete search history.

(56) References Cited

U.S. PATENT DOCUMENTS

| 7,272,021 B2* | 9/2007 | Schlecht | H02M 3/33561 |
| | | | 363/17 |
| 9,362,832 B2* | 6/2016 | Karlsson | H02M 3/33507 |
| 9,391,531 B2* | 7/2016 | Karlsson | H02M 3/33592 |

(Continued)

FOREIGN PATENT DOCUMENTS

| JP | 2009-44889 A | 2/2009 |
| JP | 2011-130521 A | 6/2011 |

(Continued)

OTHER PUBLICATIONS

International Search Report dated Apr. 21, 2015 in PCT/JP2015/053277 filed Feb. 5, 2015 (with English translation).

*Primary Examiner* — Emily P Pham
(74) *Attorney, Agent, or Firm* — Oblon, McClelland, Maier & Neustadt, L.L.P.

(57) ABSTRACT

A DC-to-DC converter includes a first switching circuit, a second switching circuit, a transformer positioned between an AC side of the first switching circuit and an AC side of the second switching circuit, an inductance element positioned between the transformer and at least one of the AC side of the first switching circuit and the AC side of the second switching circuit, and control circuitry that operates the first switching circuit and the second switching circuit. The control circuitry sets a predetermined operation ratio of the first switching circuit and the second switching circuit to each other, and adjusts, based on the predetermined operation ratio, a first operation period of the first switching circuit and a second operation period of the second switching circuit.

20 Claims, 15 Drawing Sheets

(56) References Cited

U.S. PATENT DOCUMENTS

| | | |
|---|---|---|
| 9,641,089 B2 | 5/2017 | Higaki et al. |
| 2011/0249472 A1 | 10/2011 | Jain et al. |
| 2013/0308344 A1 | 11/2013 | Rosado et al. |

FOREIGN PATENT DOCUMENTS

| | | |
|---|---|---|
| JP | 2012-065511 A | 3/2012 |
| JP | 2013-27201 A | 2/2013 |
| JP | 2014-239579 A | 12/2014 |
| WO | WO 2013/173075 A1 | 11/2013 |
| WO | WO 2015/004825 A1 | 1/2015 |

* cited by examiner

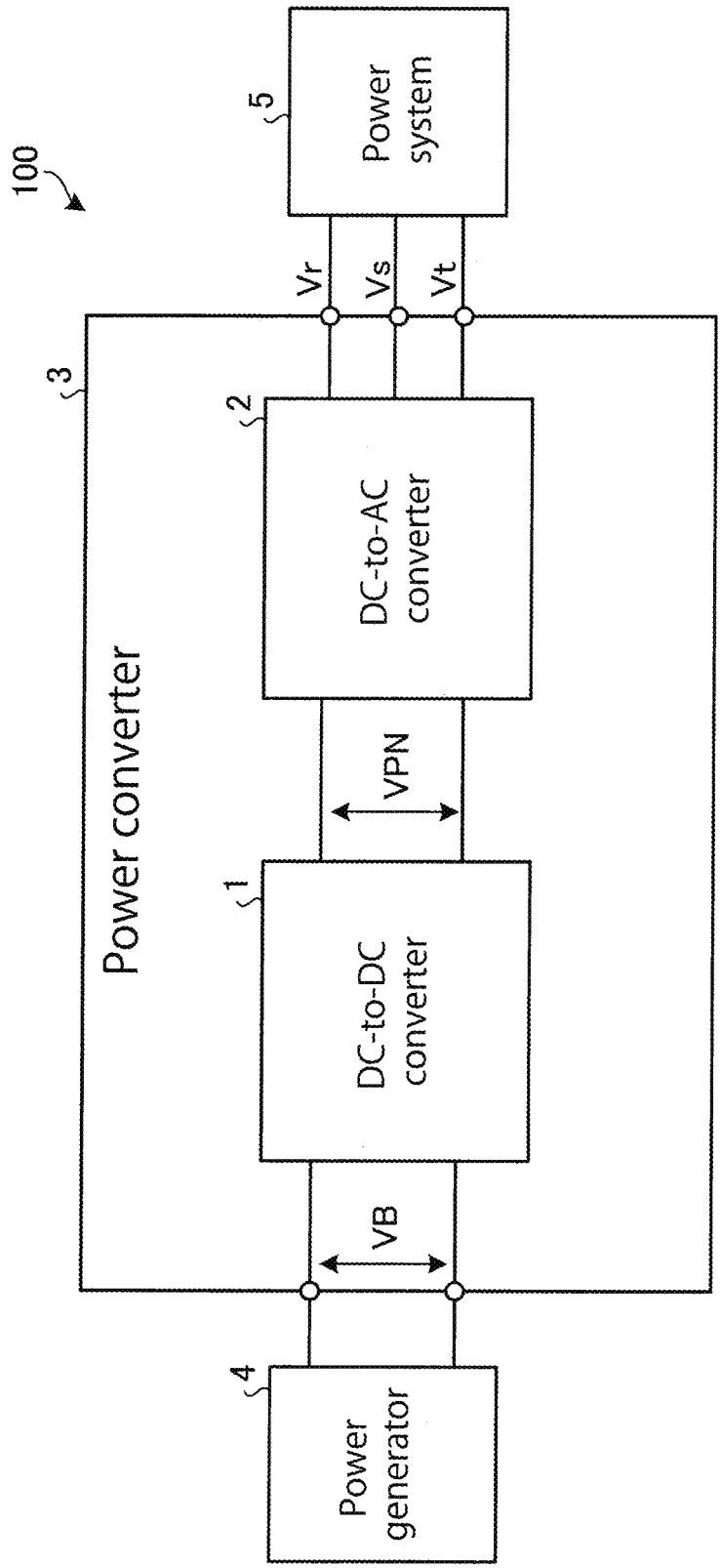

|    | T0  | T1  | T2  | T3  | T4  | T5  | T6  | T7  |
|----|-----|-----|-----|-----|-----|-----|-----|-----|
| Q1 | OFF | ON  | ON  | ON  | ON  | OFF | OFF | OFF |
| Q2 | ON  | OFF | OFF | OFF | OFF | ON  | ON  | ON  |
| Q3 | OFF | OFF | OFF | ON  | ON  | ON  | ON  | OFF |
| Q4 | ON  | ON  | ON  | OFF | OFF | OFF | OFF | ON  |
| Q5 | OFF | OFF | ON  | ON  | ON  | ON  | OFF | OFF |
| Q6 | ON  | ON  | OFF | OFF | OFF | OFF | ON  | ON  |
| Q7 | OFF | OFF | OFF | OFF | ON  | ON  | ON  | ON  |
| Q8 | ON  | ON  | ON  | ON  | OFF | OFF | OFF | OFF |

|    | T0  | T1  | T2  | T3  | T4  | T5  | T6  | T7  |
|----|-----|-----|-----|-----|-----|-----|-----|-----|
| Q1 | OFF | OFF | ON  | ON  | ON  | ON  | OFF | OFF |
| Q2 | ON  | ON  | OFF | OFF | OFF | OFF | ON  | ON  |
| Q3 | OFF | OFF | OFF | OFF | ON  | ON  | ON  | ON  |
| Q4 | ON  | ON  | ON  | ON  | OFF | OFF | OFF | OFF |
| Q5 | OFF | ON  | ON  | ON  | ON  | OFF | OFF | OFF |
| Q6 | ON  | OFF | OFF | OFF | OFF | ON  | ON  | ON  |
| Q7 | OFF | OFF | OFF | ON  | ON  | ON  | ON  | OFF |
| Q8 | ON  | ON  | ON  | OFF | OFF | OFF | OFF | ON  |

DC-TO-DC CONVERTER, POWER CONVERTER, POWER GENERATION SYSTEM, AND METHOD FOR DC-TO-DC CONVERSION

CROSS-REFERENCE TO RELATED APPLICATIONS

The present application is a continuation application of International Application No. PCT/JP2015/053277, filed Feb. 5, 2015. The contents of these applications are incorporated herein by reference in their entirety.

BACKGROUND OF THE INVENTION

Field of the Invention

The embodiments disclosed herein relate to a DC-to-DC converter, a power converter, a power generation system, and a method for DC-to-DC conversion.

Description of Background Art

Japanese Unexamined Patent Application Publication No. 2012-65511A1 discloses a DC-to-DC converter that includes two switching circuits, an inductance element, and a transformer. The two switching circuits are connected to each other through the inductance element and the transformer. With this configuration, the DC-to-DC converter utilizes electric energy flowing through the inductance element and other elements to perform power conversion.

SUMMARY OF THE INVENTION

According to one aspect of the present invention, a DC-to-DC converter includes a first switching circuit, a second switching circuit, a transformer positioned between an AC side of the first switching circuit and an AC side of the second switching circuit, an inductance element positioned between the transformer and at least one of the AC side of the first switching circuit and the AC side of the second switching circuit, and control circuitry that operates the first switching circuit and the second switching circuit. The control circuitry sets a predetermined operation ratio of the first switching circuit and the second switching circuit to each other, and adjusts, based on the predetermined operation ratio, a first operation period of the first switching circuit and a second operation period of the second switching circuit.

According to another aspect of the present invention, a power converter includes a DC-to-DC converter including a first switching circuit, a second switching circuit, a transformer positioned between an AC side of the first switching circuit and an AC side of the second switching circuit, an inductance element positioned between the transformer and at least one of the AC side of the first switching circuit and the AC side of the second switching circuit, and control circuitry that operates the first switching circuit and the second switching circuit. The control circuitry sets a predetermined operation ratio of the first switching circuit and the second switching circuit to each other, and adjusts, based on the predetermined operation ratio, a first operation period of the first switching circuit and a second operation period of the second switching circuit.

According to another aspect of the present invention, a power generation system includes a DC-to-DC converter including a first switching circuit, a second switching circuit, a transformer positioned between an AC side of the first switching circuit and an AC side of the second switching circuit, an inductance element positioned between the transformer and at least of the AC side of the first switching circuit and the AC side of the second switching circuit, and control circuitry that operates the first switching circuit and the second switching circuit, a power generator connected to a DC side of the first switching circuit, and a DC-to-AC converter connected to a DC side of the second switching circuit. The control circuitry sets a predetermined operation ratio of the first switching circuit and the second switching circuit to each other, and adjusts, based on the predetermined operation ratio, a first operation period of the first switching circuit and a second operation period of the second switching circuit.

According to the other aspect of the present invention, a method for DC-to-DC conversion includes applying a first voltage to a first winding coil of a transformer, applying a second voltage to a second winding coil of the transformer for a period between a first point of time during application of the first voltage and a second point of time after the application of the first voltage, at least one of the first voltage and the second voltage being applied through an inductance element, and setting, based on a reference ratio that is set between a first application period of the first voltage and a second application period of the second voltage and that is based on reference input power or reference output power, a non-reference ratio between the first application period of the first voltage and the second application period of the second voltage, the non-reference ratio being based on non-reference power different from the reference input power or the reference output power.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 2 is a diagram illustrating an exemplary configuration of a power generation system according to an embodiment;

DESCRIPTION OF THE EMBODIMENTS

Figure 1A:
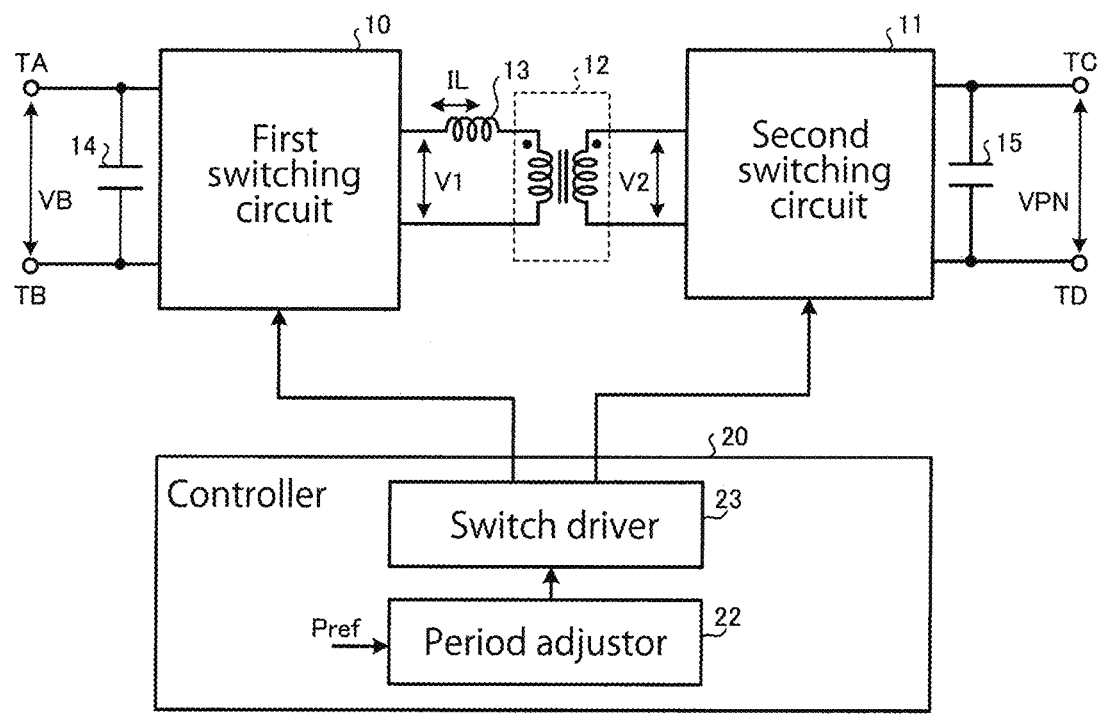
FIG. 1A is a diagram illustrating an exemplary configuration of a DC-to-DC converter according to an embodiment.

Embodiments will now be described with reference to the accompanying drawings, wherein like reference numerals designate corresponding or identical elements throughout the various drawings.

It is noted that the following embodiments are provided for exemplary purposes only and are not intended in a limiting sense.

1. DC-to-DC Converter

FIG. 1A is a diagram illustrating an exemplary configuration of a DC-to-DC converter 1 according to this embodiment. As illustrated in FIG. 1A, the DC-to-DC converter 1 includes a first switching circuit 10, a second switching circuit 11, a transformer 12, an inductance element 13, capacitors 14 and 15, and a controller 20. The DC-to-DC converter 1 performs power conversion using electric energy flowing through the inductance element 13.

The first switching circuit 10 and the second switching circuit 11 perform DC-to-AC voltage conversion and AC-to-DC voltage conversion. The capacitor 14 is connected to the DC side of the first switching circuit 10, and the capacitor 15 is connected to the DC side of the second switching circuit 11.

The AC side of the first switching circuit 10 and the AC side of the second switching circuit 11 are connected to each other through the transformer 12. The inductance element 13 is connected to at least one AC side among the AC side of the first switching circuit 10 and the AC side of the second switching circuit 11. In the embodiment of FIG. 1A, the inductance element 13 is disposed between and connected to the AC side of the first switching circuit 10 and the primary winding coil of the transformer 12. In another possible embodiment, the inductance element 13 may be disposed between and connected to the AC side of the second switching circuit 11 and the secondary winding coil of the transformer 12. In still another possible embodiment, one inductance element 13 may be disposed between and connected to the AC side of the first switching circuit 10 and the primary winding coil of the transformer 12, and another inductance element 13 may be disposed between and connected to the AC side of the second switching circuit 11 and the secondary winding coil of the transformer 12.

The controller 20 controls the first switching circuit 10 and the second switching circuit 11 in switching patterns described later. The direction in which power is converted from the first switching circuit 10 to the second switching circuit 11 is defined as regeneration direction, and the state in which power is being converted from the first switching circuit 10 to the second switching circuit 11 is defined as regeneration. The direction in which power is converted from the second switching circuit 11 to the first switching circuit 10 is defined as charging direction, and the state in which power is being converted from the second switching circuit 11 to the first switching circuit 10 is defined as charging.

The DC-to-DC converter 1 converts DC voltage VB (hereinafter occasionally referred to as voltage VB) into DC voltage VPN (hereinafter occasionally referred to as voltage VPN) in, for example, a regeneration-purpose switching pattern. The DC-to-DC converter 1 also converts the voltage VPN into the voltage VB in, for example, a charging-purpose switching pattern. The voltage VB is a voltage between terminals TA and TB at the DC side of the first switching circuit 10, and the voltage VPN is a voltage between terminals TC and TD at the DC side of the second switching circuit 11.

Figure 1B:
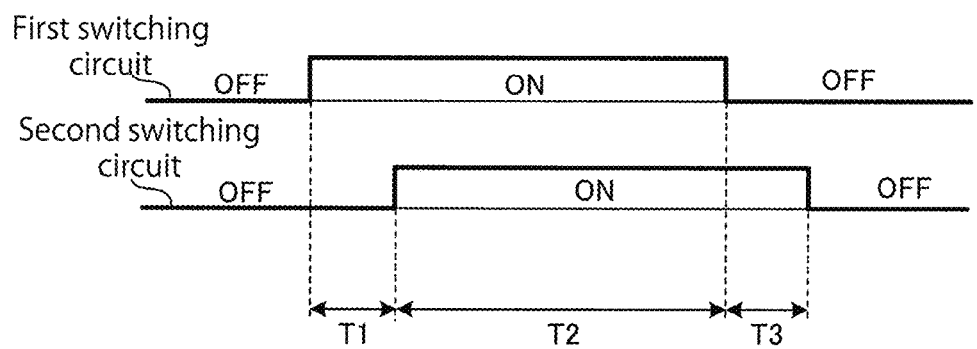
FIG. 1B illustrates exemplary periods for which a first switching circuit and a second switching circuit illustrated in FIG. 1A are to operate.

FIG. 1B illustrates exemplary periods for which the first switching circuit 10 and the second switching circuit 11 are to operate. The controller 20 controls the first switching circuit 10 and the second switching circuit 11 according to FIG. 1B, with a carrier of positivity and negativity repeated. Specifically, as illustrated in FIG. 1B, the controller 20 causes the first switching circuit 10 to operate in a first period T1, causes the first switching circuit 10 and the second switching circuit 11 to operate in a second period T2, and causes the second switching circuit 11 to operate in a third period T3.

By controlling the first switching circuit 10 and the second switching circuit 11 in this manner, the controller 20 causes magnetic energy to be output from the first switching circuit 10 and accumulated in the inductance element 13, and causes the magnetic energy to be output as electric energy from the DC side of the second switching circuit 11 through the transformer 12. The period T1 is a non-limiting example of the first period recited in the appended claims, the second period T2 is a non-limiting example of the second period recited in the appended claims, and the third period T3 is a non-limiting example of the third period recited in the appended claims.

The controller 20 adjusts the ratio between the periods for which the first switching circuit 10 and the second switching circuit 11 are to operate and adjusts the lengths of the periods for which the first switching circuit 10 and the second switching circuit 11 so as to control the input power and the output power. Specifically, in order to control the input power and the output power, the controller 20 modulates the operation periods of the first switching circuit 10 and the second switching circuit 11. In the following description, the degree to which the operation periods are modulated will be occasionally referred to as modulation degree, and the maximum modulation degree will be occasionally referred to as maximum modulation.

The controller 20 includes a period adjustor 22 and a switch driver 23. The period adjustor 22 sets a ratio of the reference periods TR1, TR2, and TR3 (which are non-limiting examples of the first reference operation period, the second reference operation period, and the third reference operation period, respectively, recited in the appended claims) to each other. Based on the reference periods TR1, TR2, and TR3, the period adjustor 22 sets a ratio of periods T1, T2, and T3 to each other. The period adjustor 22 also adjusts the periods T1, T2, and T3 based on the input power or the output power.

For example, the period adjustor 22 sets the ratio of the reference periods TR1, TR2, and TR3 to each other as the ratio of the periods T1, T2, and T3 to each other, and adjusts the periods T1, T2, and T3 based on a power command $P_{ref}$. Specifically, the period adjustor 22 multiplies each of the reference periods TR1, TR2, and TR3 by a ratio $D_{ref}$, which depends on the power command $P_{ref}$, so as to obtain periods T1 (=TR1×$D_{ref}$), T2 (=TR2×$D_{ref}$) and T3 (=TR3×$D_{ref}$).

The power command $P_{ref}$ specifies power input into one of the first switching circuit 10 and the second switching circuit 11 (this power will be hereinafter occasionally referred to as input power) or specifies power output from another one of the first switching circuit 10 and the second switching circuit 11 (this power will be hereinafter occasionally referred to as output power). The reference periods TR1, TR2, and TR3 are the periods T1, T2, and T3 in the case where, for example, the input power or the output power is reference power. In this embodiment, the reference power is the input power or the output power at the time of maximum modulation in the DC-to-DC converter 1. The reference periods TR1, TR2, and TR3 in this case will be hereinafter occasionally referred to as maximum-modulation reference periods TR1, TR2, and TR3, respectively.

Based on the periods T1, T2, and T3 adjusted by the period adjustor 22, the switch driver 23 controls the first switching circuit 10 and the second switching circuit 11 in the regeneration-purpose switching pattern. In this manner, the switch driver 23 converts the voltage VB into the voltage VPN. The conversion of the voltage VPN into the voltage VB is performed as follows. Based on the periods T1, T2, and T3 adjusted by the period adjustor 22, the switch driver 23 causes the second switching circuit 11 to operate for the periods T1 through T2 in the charging-purpose switching pattern, and causes the first switching circuit 10 to operate for the periods T2 through T3 in the charging-purpose switching pattern.

Thus, based on the operation ratio of the first switching circuit 10 and the second switching circuit 11 to each other (the ratio of the reference periods TR1, TR2, and TR3 to each other), the DC-to-DC converter 1 sets a non-reference operation ratio of the first switching circuit 10 and the second switching circuit 11 to each other (the ratio of the periods T1, T2, and T3 to each other) when the input power or the output power is different from the reference power.

This configuration ensures that by appropriately setting the operation ratio of the first switching circuit 10 and the second switching circuit 11 to each other at the time of input or output of the reference power, the current flowing through the inductance element 13 is readily minimized. This configuration, as a result, facilitates the attempt to minimize the degradation of power conversion efficiency in the DC-to-DC converter 1.

Additionally, the DC-to-DC converter 1 adjusts the periods T1, T2, and T3 based on the power command $P_{ref}$. This configuration facilitates and makes more rapid the adjustment of the periods T1, T2, and T3. The DC-to-DC converter 1 will be described in more detail below.

2. Power Generation System

An exemplary power generation system that includes the DC-to-DC converter 1 will be described in detail below. FIG. 2 is a diagram illustrating an exemplary configuration of a power generation system 100 according to this embodiment.

As illustrated in FIG. 2, the power generation system 100 includes a power converter 3 and a power generator 4. The power generator 4 generates DC (Direct-Current) power. The power converter 3 converts the DC power into AC (Alternating-Current) power and outputs the AC power to the power system 5. Examples of the power generator 4 include, but are not limited to, a solar cell, a DC electric generator, and a fuel cell.

The power converter 3 includes the DC-to-DC converter 1 and a DC-to-AC converter 2. The DC-to-DC converter 1 steps up or down the voltage VB output from the power generator 4 to generate the voltage VPN, and outputs the voltage VPN to the DC-to-AC converter 2. The DC-to-AC converter 2 converts the voltage VPN into three-phase AC voltages Vr, Vs, and Vt that are adapted to the power system 5. Then, the DC-to-AC converter 2 outputs the three-phase AC voltages Vr, Vs, and Vt to the power system 5.

In another possible embodiment, the power generator 4 illustrated in FIG. 2 may be replaced with a charger so that the charger and the power converter 3 implement a charging system (or a DC supply system). In this case, the DC-to-AC converter 2 converts the three-phase AC voltages Vr, Vs, and Vt into the voltage VPN, and the DC-to-DC converter 1 steps up or down the voltage VPN into the voltage VB.

2.1. Exemplary Configuration of DC-to-DC Converter 1

Figure 3:
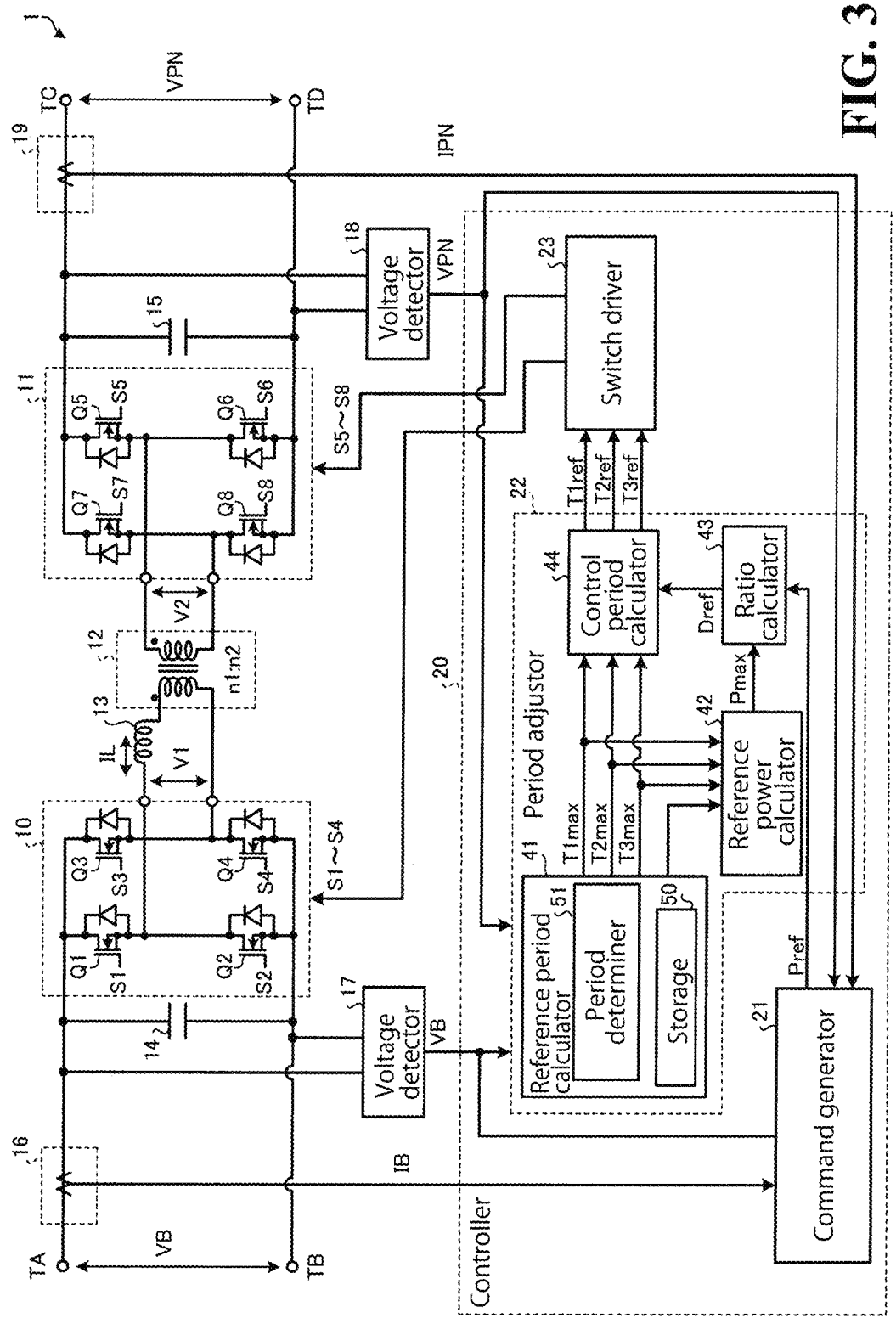
FIG. 3 is a diagram illustrating an exemplary configuration of the DC-to-DC converter illustrated in FIG. 2.

FIG. 3 is a diagram illustrating an exemplary configuration of the DC-to-DC converter 1 illustrated in FIG. 2. The DC-to-DC converter 1 illustrated in FIG. 3 is a Dual Active Bridge (DAB) isolated DC-to-DC converter. This configuration, however, is not intended in a limiting sense.

The DC-to-DC converter 1 includes the first switching circuit 10, the second switching circuit 11, the transformer 12, the inductance element 13, the capacitors 14 and 15, current detectors 16 and 19, voltage detectors 17 and 18, and the controller 20.

The first switching circuit 10 is a bridge circuit that includes a full bridge of a plurality of switching elements Q1, Q2, Q3, and Q4. The second switching circuit 11 is a bridge circuit that includes a full bridge of a plurality of switching elements Q5, Q6, Q7, and Q8. Each of the switching elements Q1 to Q8 is a semiconductor device such as a metal-oxide-semiconductor field-effect transistor (MOSFET) and an insulated gate bipolar transistor (IGBT).

The transformer 12 is disposed between the AC side of the first switching circuit 10 and the AC side of the second switching circuit 11. The primary winding coil of the transformer 12 (which is a non-limiting example of the first winding coil at a side of the first switching circuit recited in the appended claims) and the secondary winding coil (which is a non-limiting example of the second winding coil at a side of the second switching circuit recited in the appended claims) have a winding coil ratio of n1:n2 (=N:1). A non-limiting example of the transformer 12 is an isolation transformer that ensures an isolation between the first switching circuit 10 side and the second switching circuit 11 side. The ratio of the secondary winding coil of the transformer 12 to the primary winding coil of the transformer 12 will be hereinafter occasionally referred to as winding coil ratio N (=n1/n2).

The inductance element 13 is disposed at the AC side of the first switching circuit 10 and is connected in series to the primary winding coil of the transformer 12. In this embodiment, the inductance element 13 is a reactor. When the current flowing through the inductance element 13 is small in amount, the inductance element 13 may be an inductor.

The current detector 16 detects an instantaneous value of the DC current flowing between the power generator 4 and the DC-to-DC converter 1 (this instantaneous value will be hereinafter occasionally referred to as DC current IB). The current detector 19 detects an instantaneous value of the DC current flowing between the DC-to-DC converter 1 and the DC-to-AC converter 2 (this instantaneous value will be hereinafter occasionally referred to as DC current IPN). A non-limiting example of each of the current detectors 16 and 19 is a current sensor that utilizes a Hall element, which is a magnetoelectric conversion device. The voltage detector 17 detects an instantaneous value of the voltage VB between the DC-side terminals TA and TB (this instantaneous value will be hereinafter occasionally referred to as the DC voltage VB). The voltage detector 18 detects an instantaneous value of the voltage VPN between the DC-side terminals TC and TD (this instantaneous value will be hereinafter occasionally referred to as the DC voltage VPN).

Figure 4A:
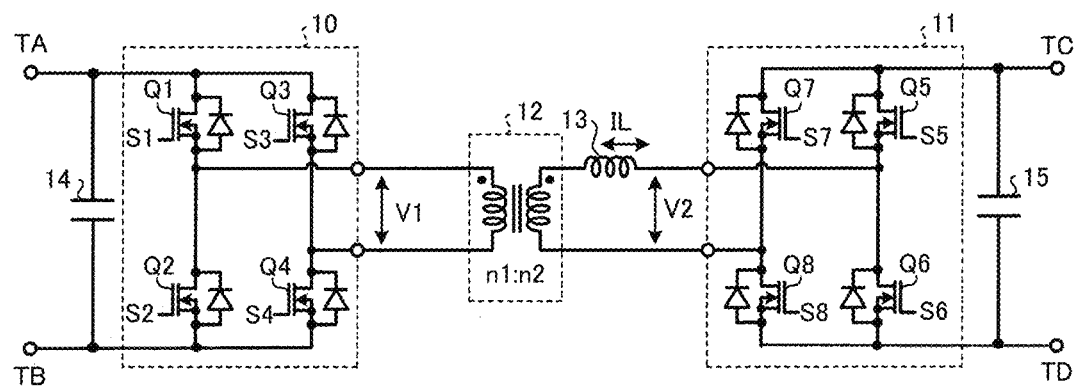
FIG. 4A is a diagram illustrating another exemplary configuration of the DC-to-DC converter.
Figure 4B:
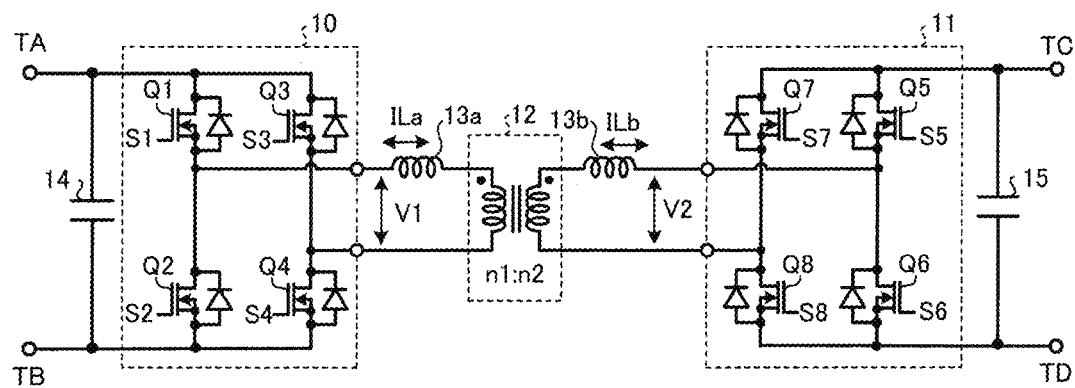
FIG. 4B is a diagram illustrating still another exemplary configuration of the DC-to-DC converter.

The location of the inductance element 13 will not be limited to the location illustrated in FIG. 3. Other possible locations are illustrated in FIGS. 4A and 4B. FIG. 4A is a diagram illustrating another exemplary configuration of the DC-to-DC converter 1, and FIG. 4B is a diagram illustrating still another exemplary configuration of the DC-to-DC converter 1. Some elements of the DC-to-DC converter 1 common in FIGS. 3, 4A, and 4B are not illustrated in FIGS. 4A and 4B.

The DC-to-DC converter 1 illustrated in FIG. 4A includes an inductance element 13. The inductance element 13 is disposed at the AC side of the second switching circuit 11 and is connected in series to the primary winding coil of the transformer 12. The DC-to-DC converter 1 illustrated in FIG. 4B includes an inductance element 13a and an inductance element 13b. The inductance element 13a is disposed at the AC side of the first switching circuit 10 and is connected in series to the primary winding coil of the transformer 12. The inductance element 13b is disposed at the AC side of the second switching circuit 11 and is connected in series to the primary winding coil of the transformer 12.

2.2. Controller 20

The controller 20 controls the first switching circuit 10 and the second switching circuit 11 based on the DC current IB detected by the current detector 16, the voltage VB detected by the voltage detector 17, and the voltage VPN detected by the voltage detector 18.

The controller 20 includes a microcomputer and various circuits. The microcomputer includes a central processing unit (CPU), a read only memory (ROM), a random access memory (RAM), and input-output ports. The CPU of the microcomputer reads a program stored in the ROM and executes the program, and thus implements the control described later.

As illustrated in FIG. 3, the controller 20 includes a command generator 21, the period adjustor 22, and the switch driver 23. The functions of the command generator 21, the period adjustor 22, and the switch driver 23 are implemented by, for example, the above-described CPU when the CPU reads and executes the program. One or all of the command generator 21, the period adjustor 22, and the switch driver 23 may be implemented by hardware alone.

2.3. Command Generator 21

The command generator 21 obtains the power command $P_{ref}$ based on, for example, the DC current IB, the DC voltage VB, the DC current IPN, the DC voltage VPN, and a DC voltage command $VPN_{ref}$.

Figure 5:
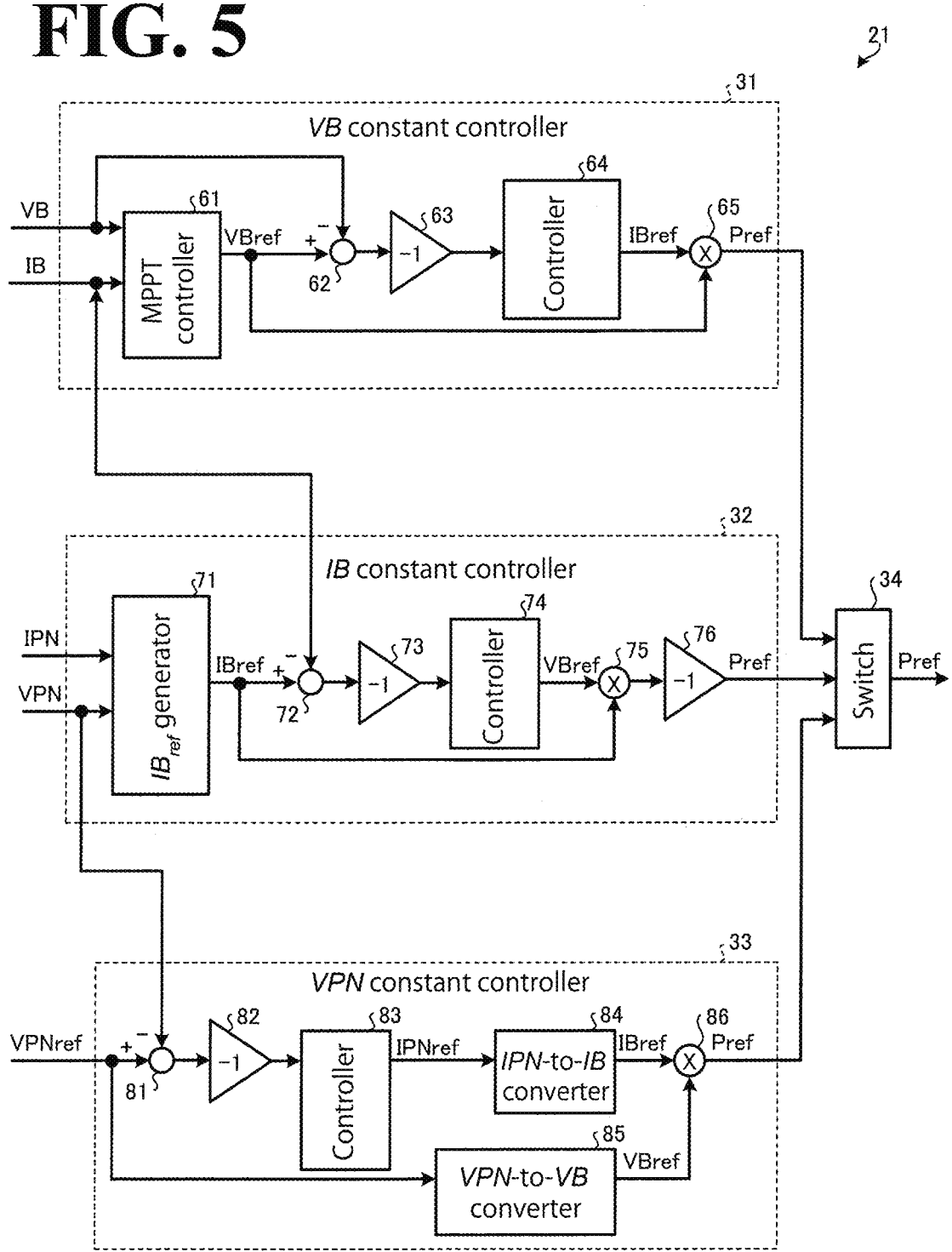
FIG. 5 is a diagram illustrating an exemplary configuration of a command generator.

FIG. 5 is a diagram illustrating an exemplary configuration of the command generator 21. As illustrated in FIG. 5, the command generator 21 includes a VB constant controller 31, an IB constant controller 32, a VPN constant controller 33, and a switch 34.

The VB constant controller 31 includes an MPPT controller 61, a subtractor 62, an amplifier 63, a controller 64, and a multiplier 65. With this configuration, the VB constant controller 31 obtains the power command $P_{ref}$.

The MPPT controller 61 performs Maximum Power Point Tracking (MPPT) control based on the power supplied from the power generator 4 to the DC-to-DC converter 1 (this power will be hereinafter occasionally referred to as supplied power PB). The MPPT controller 61 multiplies the DC current IB by the voltage VB to obtain the supplied power PB. Then, the MPPT controller 61 generates a DC voltage command $VB_{ref}$ to maximize the supplied power PB.

The subtractor 62 subtracts the DC voltage VB from the DC voltage command $VB_{ref}$. The amplifier 63 amplifies the difference obtained at the subtractor 62 by multiplying the difference by −1. The controller 64 performs Proportional (P) control, Proportional Integration (PI) control, or Proportional Integration Differentiation (PID) control to, for example, make zero or make decrease the result obtained by the amplification at the amplifier 63, thereby generating a DC current command $IB_{ref}$. The multiplier 65 multiplies the DC current command $IB_{ref}$ by the DC voltage command $VB_{ref}$ to obtain the power command $P_{ref}$.

The IB constant controller 32 includes an $IB_{ref}$ generator 71, a subtractor 72, an amplifier 73, a controller 74, a multiplier 75, and an amplifier 76. With this configuration, the IB constant controller 32 obtains the power command $P_{ref}$.

The $IB_{ref}$ generator 71 generates the DC current command $IB_{ref}$ based on the DC voltage VPN and the DC current IPN. For example, the $IB_{ref}$ generator 71 generates the DC current command $IB_{ref}$ to make the DC voltage VPN a predetermined voltage and make the DC current IPN a predetermined current.

The subtractor 72 subtracts the DC current IB from the DC current command $IB_{ref}$. The amplifier 73 amplifies the difference obtained at the subtractor 72 by multiplying the difference by −1. The controller 74 performs P control, PI control, or PID control to, for example, make zero or make decrease the result obtained by the amplification at the amplifier 73, thereby generating the DC voltage command $VB_{ref}$. The multiplier 75 multiplies a DC current command $IPN_{ref}$ by the DC voltage command $VPN_{ref}$. The amplifier 76 multiplies the product obtained at the multiplier 75 by "−1" to obtain the power command $P_{ref}$.

The VPN constant controller 33 includes a subtractor 81, an amplifier 82, a controller 83, an IPN-to-IB converter 84, a VPN-to-VB converter 85, and a multiplier 86.

The subtractor 81 subtracts the DC voltage VPN from the DC voltage command $VPN_{ref}$. The amplifier 82 amplifies the difference obtained at the subtractor 81 by multiplying the difference by −1. The controller 83 performs P control, PI control, or PID control to, for example, make zero or make decrease the result obtained by the amplification at the amplifier 82, thereby generating the DC current command $IPN_{ref}$.

The IPN-to-IB converter 84 includes a conversion table that correlates the DC current command $IPN_{ref}$ with the DC current command $IB_{ref}$. Based on the conversion table, the IPN-to-IB converter 84 converts the DC current command $IPN_{ref}$ into the DC current command $IB_{ref}$. The VPN-to-VB converter 85 includes a conversion table that correlates the DC voltage command $VPN_{ref}$ with the DC voltage command $VB_{ref}$. Based on the conversion table, the VPN-to-VB converter 85 converts the DC voltage command $VPN_{ref}$ into the DC voltage command $VB_{ref}$. The multiplier 86 multiplies the DC current command $IB_{ref}$ by the DC voltage command $VB_{ref}$ to obtain the power command $P_{ref}$.

The switch 34 selects and outputs one of the power command $P_{ref}$ generated by the VB constant controller 31, the power command $P_{ref}$ generated by the IB constant controller 32, and the power command $P_{ref}$ generated by the VPN constant controller 33.

When the switch 34 is interconnected with the power system 5, that is, when the DC-to-AC converter 2 is connected to the power system 5, the switch 34 outputs the power command $P_{ref}$ generated by the VB constant controller 31 at the time of regeneration, while at the time of charging, the switch 34 outputs the power command $P_{ref}$ generated by the IB constant controller 32. When the switch 34 is self-sustaining, without interconnection with the power system 5, that is, when the DC-to-AC converter 2 is not connected to the power system 5, the switch 34 outputs the power command $P_{ref}$ generated by the VPN constant controller 33.

2.4. Period Adjustor 22

The period adjustor 22 includes a reference period calculator 41, a reference power calculator 42, a ratio calculator 43, and a control period calculator 44.

The reference period calculator 41 calculates periods $T1_{max}$, a $T2_{max}$, and $T3_{max}$ (which are non-limiting examples of the first reference operation period, the second reference operation period, and the third reference operation period, respectively, recited in the appended claims). The periods $T1_{max}$, $T2_{max}$, and $T3_{max}$ respectively correspond to the maximum-modulation reference periods TR1, TR2, and TR3 and are set to make, for example, the power conversion efficiency in the DC-to-DC converter 1 high. Exemplary periods $T1_{max}$, $T2_{max}$, and $T3_{max}$ will be described below. For ease of description, the following description is under the assumption that switching losses in the first switching circuit 10 and the second switching circuit 11 are negligible.

Figure 6:
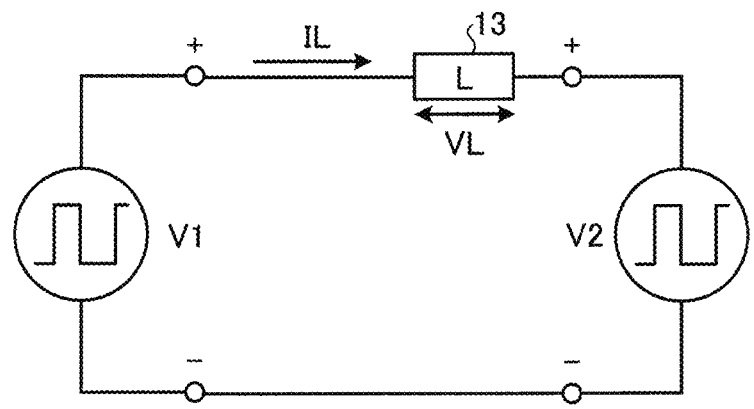
FIG. 6 illustrates an equivalent circuit model of AC voltage at one end and AC voltage at another end of an inductance element of the DC-to-DC converter.

FIG. 6 illustrates an equivalent circuit model of AC voltage at one end and AC voltage at another end of the inductance element 13 of the DC-to-DC converter 1. In FIG. 6, the voltage at the one end of the inductance element 13 (the voltage at the side of the first switching circuit 10) is denoted voltage V1, and the voltage at the another end of the inductance element 13 (the voltage at the side of the second switching circuit 11) is denoted voltage V2. Also in FIG. 6, the current flowing through the inductance element 13 is denoted current IL. The voltage V1 is a pulse voltage having an amplitude of voltage VB, and the voltage V2 is a pulse voltage having an amplitude of N×VPN. In the configuration illustrated in FIG. 4B, the inductance value, L, is a combination of the inductance value of the inductance element 13a and the inductance value of the inductance element 13b. For example, when N=1, the inductance value L is the sum of the inductance values of the inductance elements 13a and 13b.

Figure 7:
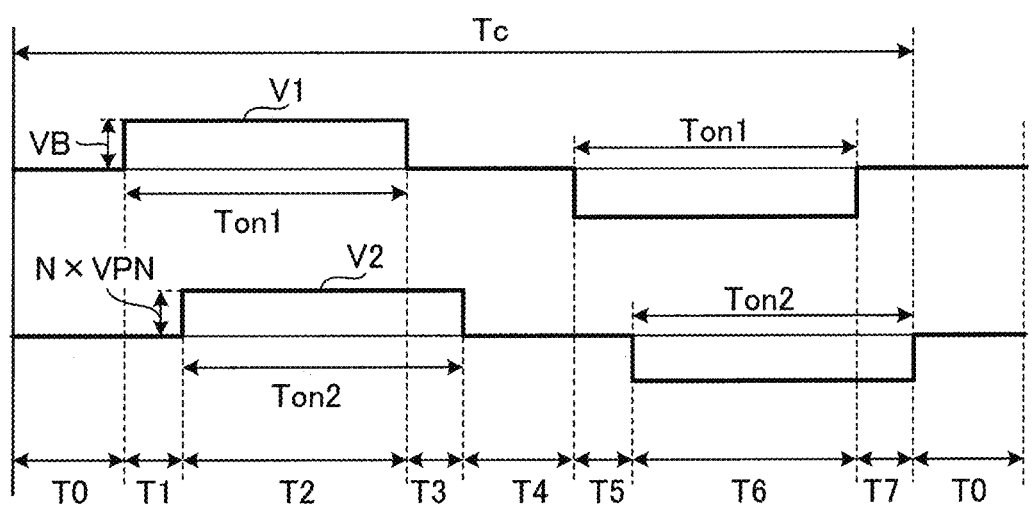
FIG. 7 illustrates an example of how voltages are controlled at the time of regeneration.

The control of the voltages V1 and V2 at the time of regeneration and the control of the voltages V1 and V2 at the time of charging will be described. The voltages V1 and V2 at the time of regeneration are controlled by the controller 20 in the manner illustrated in FIG. 7. FIG. 7 illustrates an example of how the voltages V1 and V2 are controlled at the time of regeneration.

In FIG. 7, the ON pulse width of the voltage V1 at the time of regeneration is denoted Ton1, and the ON pulse width of the voltage V2 at the time of regeneration is denoted Ton2. Also in FIG. 7, periods T0 to T7 are defined by the operation state of the first switching circuit 10 and the second switching circuit 11.

In one control period (hereinafter occasionally referred to as carrier period Tc), the controller 20 causes the first switching circuit 10 and the second switching circuit 11 to perform positive and negative switching operations. In the carrier period Tc, T0=T4, T1=T5, T2=T6, and T3=T7.

That is, the carrier period Tc and the periods T0 to T7 have a relationship represented by the following Formula (1):

$$Tc/2=(T0+T1+T2+T3)=(T4+T5+T6+T7) \quad (1)$$

The period T0 (=T4) can be obtained from the following Formula (2):

$$T0=Tc/2-(T1+T2+T3) \quad (2)$$

Thus, by obtaining the three periods T1, T2, and T3 among the eight periods T0 to T7, the rest of the periods can be obtained. Ton1 and Ton2 have a relationship represented by the following Formula (3):

$$Ton1 \times VB = Ton2 \times N \times VPN \quad (3)$$

Figures 8, 9:
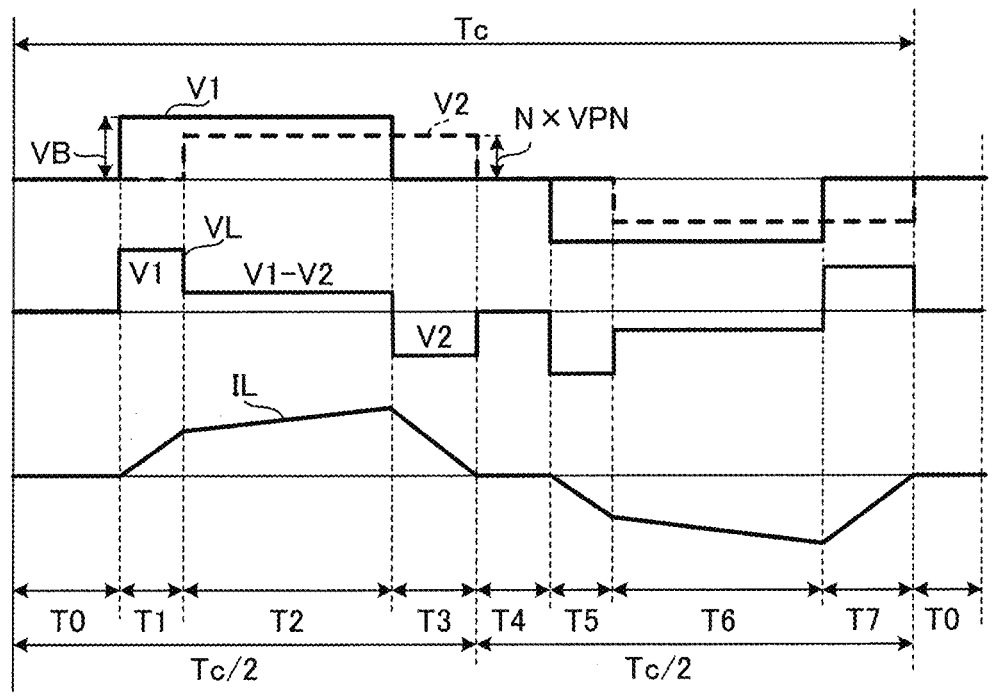
FIG. 8 is a table illustrating whether each switching element is in ON or OFF state at each period at the time of regeneration.
FIG. 9 illustrates an exemplary relationship at the time of regeneration between the voltages at both ends of the inductance element, voltage applied to the inductance element, and current flowing through the inductance element.

FIG. 8 is a table illustrating whether each of the switching elements Q1 to Q8 is in ON or OFF state at each of the periods T0 to T7 at the time of regeneration. FIG. 9 illustrates an exemplary relationship at the time of regeneration between the voltages V1 and V2 at both ends of the inductance element 13, the voltage, VL, applied to the inductance element 13, and the current IL flowing through the inductance element 13.

As illustrated in FIGS. 8 and 9, for the period T0, the switching elements Q2, Q4, Q6, and Q8 are on, the other switching elements Q1, Q3, Q5, and Q7 are off, the voltage VL applied to the inductance element 13 is zero, and the current IL flowing through the inductance element 13 is zero.

In the first period T1, the switching elements Q1, Q4, Q6, and Q8 are on, the other switching elements Q2, Q3, Q5, and Q7 are off, and a current IL based on the voltage VL (=VB) flows through the inductance element 13.

In the second period T2, the switching elements Q1, Q4, Q5, and Q8 are on, the other switching elements Q2, Q3, Q6, and Q7 are off, and a current IL based on the voltage VL (=VB−N×VPN) flows through the inductance element 13. When VB>N×VPN, the voltage VL is positive, while when VB<N×VPN, the voltage VL is negative.

In the third period T3, the switching elements Q1, Q3, Q5, and Q8 are on, the other switching elements Q2, Q4, Q6, and Q7 are off, and a current IL based on the voltage VL (=N×VPN) flows through the inductance element 13.

Figures 10, 11:
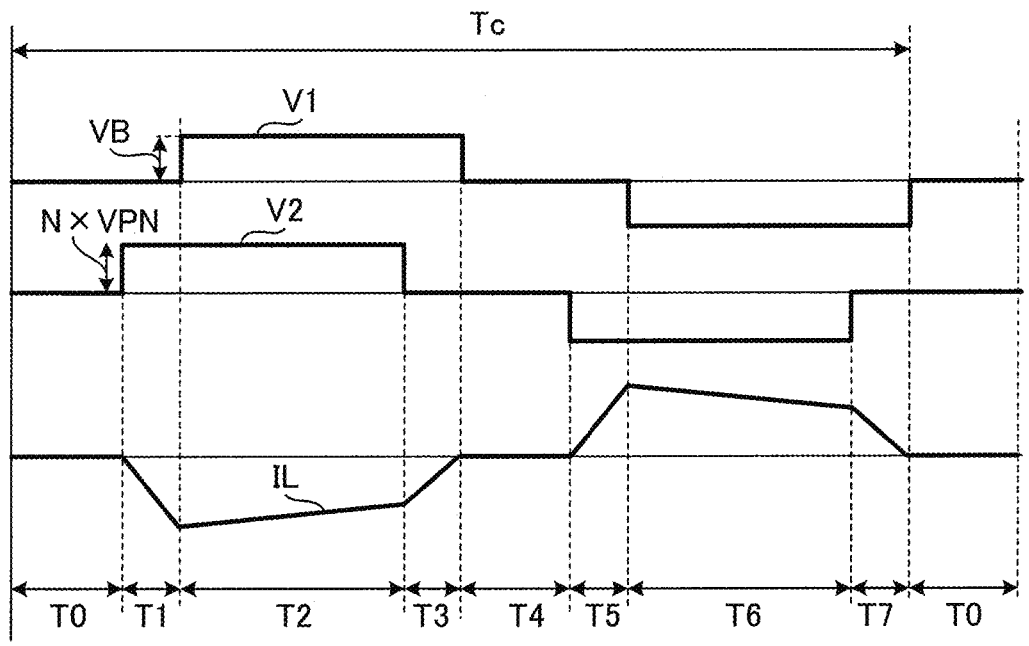
FIG. 10 illustrates an exemplary relationship at the time of charging between the voltages at both ends of the inductance element, voltage applied to the inductance element, and current flowing through the inductance element.
FIG. 11 is a table illustrating whether each switching element is in ON or OFF state at each period at the time of charging.

Next, the voltages V1 and V2 at the time of charging will be described. The voltages V1 and V2 at the time of charging are controlled by the controller 20 in the manner illustrated in FIG. 10. FIG. 10 illustrates an example of how the voltages V1 and V2 are controlled at the time of charging.

As illustrated in FIG. 10, at the time of charging, that is, when the power conversion direction is the charging direction, the period adjustor 22 causes the second switching circuit 11 to operate in the periods T1 and T5, causes the first switching circuit 10 and the second switching circuit 11 to operate in the periods T2 and T6, and causes the first switching circuit 10 to operate in the periods T3 and T7. The periods T1 and T5 are non-limiting examples of the first period recited in the appended claims, the periods T2 and T6 are non-limiting examples of the second period recited in the appended claims, and the periods T3 and T7 are non-limiting examples of the third period recited in the appended claims.

FIG. 11 is a table illustrating whether each of the switching elements Q1 to Q8 is in ON or OFF state at each of the periods T0 to T7 when the power conversion direction is the charging direction. The period adjustor 22 generates period commands T$1_{ref}$, T$2_{ref}$, and T$3_{ref}$. Based on the period commands T$1_{ref}$, T$2_{ref}$, and T$3_{ref}$, the switch driver 23 performs the switching control illustrated in FIGS. 10 and 11 so as to cause the first switching circuit 10 and the second switching circuit 11 to operate.

By controlling the first switching circuit 10 and the second switching circuit 10 in this manner, the switch driver 23 causes the power from one of the first switching circuit 10 and the second switching circuit 11 to be accumulated as magnetic energy in the inductance element 13 (or the inductance elements 13a and 13b) and causes the magnetic energy to be output as electric energy from the DC side of the other one of the first switching circuit 10 and the second switching circuit 11.

As the current IL flowing through the inductance element 13 increases, the conduction loss in the transformer 12 increases, resulting in degraded power conversion efficiency of the DC-to-DC converter 1. In view of this situation, it is preferable to minimize the current IL so as to minimize the conduction loss in the transformer 12.

Figure 12:
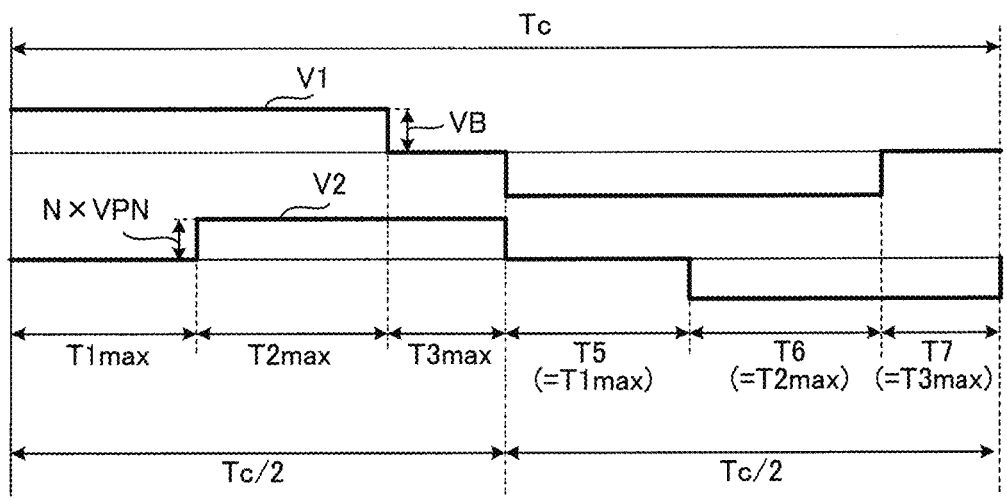
FIG. 12 illustrates time definitions in maximum modulation at the time of regeneration.
Figure 13:
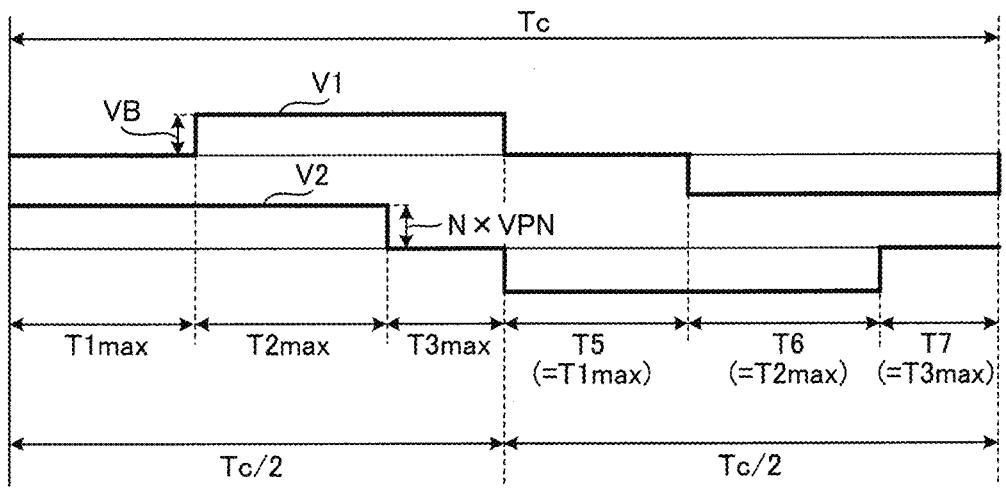
FIG. 13 illustrates time definitions in maximum modulation at the time of charging.

The current IL can be reduced by making the second period T2 longer. The second period T2 is longest among the first period T1, the second period T2, and the third period T3 when T0=0, which is the time of maximum modulation. FIGS. 12 and 13 illustrate time definitions in maximum modulation, where the periods T1, T2, and T3 in maximum modulation are respectively denoted periods T$1_{max}$, T$2_{max}$, and T$3_{max}$. FIG. 12 illustrates time definitions at the time of regeneration, and FIG. 13 illustrates time definitions at the time of charging.

Examples of how to obtain periods T$1_{max}$, T$2_{max}$, and T$3_{max}$ will be described, first in the case of VB>N×VPN and then in the case of VB≤N×VPN.

When VB>N×VPN and when the power conversion direction is the regeneration direction, the periods T2 and T3 are controlled, with the first period T1 kept at period T$1_{min}$. In this case, Ton2 can be obtained using the following Formula (5):

$$Ton2 = Tc/2 - T1_{min} \tag{5}$$

From Formula (3), Ton1 can be obtained using the following Formula (6):

$$Ton1 = Ton2 \times \{(N \times VPN)/VB\} \tag{6}$$

Thus, the periods T$1_{max}$, T$2_{max}$, and T$3_{max}$ for which the current IL is reduced can be obtained using the following Formulae (7) to (9):

$$T2_{max} = Ton1 - T1_{min} \tag{7}$$

$$T3_{max} = Ton2 - T2_{max} \tag{8}$$

$$T1_{max} = Tc/2 - (T2_{max} + T3_{max}) = T1_{min} \tag{9}$$

When VB>N×VPN and when the power conversion direction is the charging direction, the periods T1 and T2 are controlled, with the third period T3 kept at period T$3_{min}$. In this case, Ton1 can be obtained using the following Formula (10):

$$Ton2 = Tc/2 - T3_{min} \tag{10}$$

From Formula (10), Ton1 can be obtained using the following Formula (11):

$$Ton1 = Ton2 \times \{(N \times VPN)/VB\} \tag{11}$$

Thus, the periods T$1_{max}$, T$2_{max}$, and T$3_{max}$ for which the current IL is reduced can be obtained using the following Formulae (12) to (14):

$$T2_{max} = Ton1 - T3_{min} \tag{12}$$

$$T1_{max} = Ton2 - T2_{max} \tag{13}$$

$$T3_{max} = Tc/2 - (T1_{max} + T2_{max}) = T3_{min} \tag{14}$$

When VB≤N×VPN and when the power conversion direction is the regeneration direction, the periods T1 and T2 are controlled, with the third period T3 kept at the period T$3_{min}$. Thus, Ton1 can be obtained using the following Formula (15):

$$Ton1 = Tc/2 - T3_{min} \tag{15}$$

From Formula (3), Ton2 can be obtained using the following Formula (16):

$$Ton2 = Ton1 \times \{VB/(N \times VPN)\} \tag{16}$$

Thus, the periods T$1_{max}$, T$2_{max}$, and T$3_{max}$ for which the current IL is reduced can be obtained using the following Formulae (17) to (19):

$$T2_{max} = Ton2 - T3_{min} \tag{17}$$

$$T1_{max} = Ton1 - T2_{max} \tag{18}$$

$$T3_{max} = Tc/2 - (T1_{max} + T2_{max}) = T3_{min} \tag{19}$$

When VB≤N×VPN and when the power conversion direction is the charging direction, the periods T2 and T3 are controlled, with the first period T1 kept at the period T$1_{min}$. Thus, Ton2 can be obtained using the following Formula (20):

$$Ton1 = Tc/2 - T1_{min} \tag{20}$$

From Formula (20), Ton2 can be obtained using the following Formula (21):

$$Ton2 = Ton1 \times \{VB/(N \times VPN)\} \tag{21}$$

Thus, the periods T$1_{max}$, T$2_{max}$, and T$3_{max}$ for which the current IL is reduced can be obtained using the following Formulae (22) to (24):

$$T2_{max} = Ton2 - T1_{min} \tag{22}$$

$$T3_{max} = Ton1 - T2_{max} \tag{23}$$

$$T1_{max} = Tc/2 - (T2_{max} + T3_{max}) = T1_{min} \tag{24}$$

Figure 14:
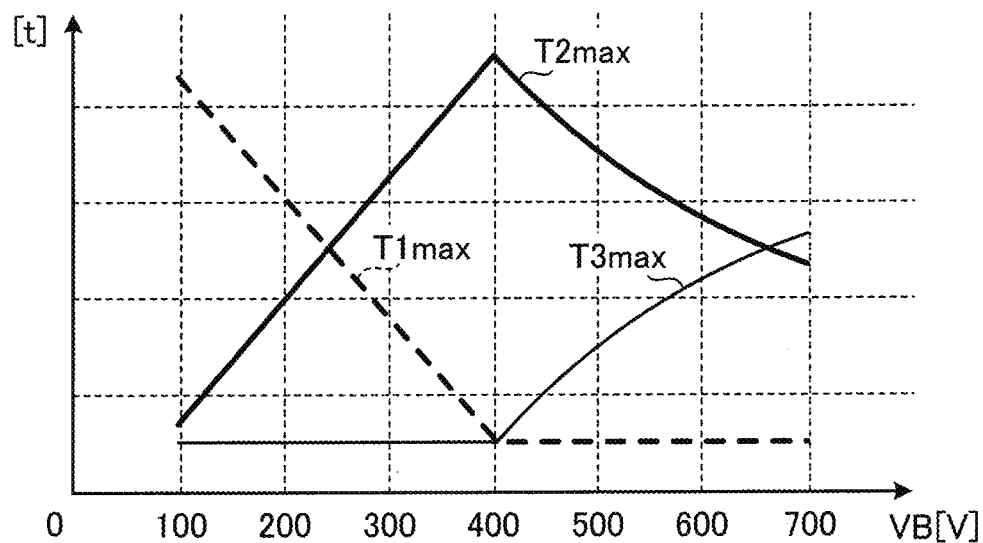
FIG. 14 illustrates periods as a function of the voltage VB.

FIG. 14 illustrates the periods T$1_{max}$, T$2_{max}$, and T$3_{max}$ as functions of the voltage VB calculated using Formulae (5) to (9) and the voltage VB calculated using and Formulae (15) to (19) when the power conversion direction is the regeneration direction. In FIG. 14, VPN is 400 [V], and VB is 100 [V] to 700 [V]. When the power conversion direction is the charging direction, the periods T$1_{max}$, T$2_{max}$, and T$3_{max}$ are functions of the voltage VB calculated using Formulae (10)

to (14) and the voltage VB calculated using Formulae (20) to (24), and can be seen in FIG. 14 by interchanging "T1$_{max}$" and "T3$_{max}$" with each other.

Referring again to FIG. 3, the period adjustor 22 will be further described. The reference period calculator 41 includes a storage 50 (which is a non-limiting example of the minimal value storage recited in the appended claims) and a period determiner 51. The storage 50 stores parameters such as the carrier period Tc, the winding coil ratio N, and the minimal periods T1$_{min}$ and T3$_{min}$. The minimal periods T1$_{min}$ and T3$_{min}$ may be set in the storage 50 through an external input device, not illustrated.

The period determiner 51 calculates the periods T1$_{max}$, T2$_{max}$, and T3$_{max}$. For example, the period determiner 51 obtains from the storage 50 the carrier period Tc, the winding coil ratio N, and the minimal periods T1$_{min}$ and T3$_{min}$, and obtains the voltage VB and the voltage VPN from the voltage detectors 17 and 18. Based on the obtained information and the power conversion direction, the period determiner 51 obtains the periods T1$_{max}$, T2$_{max}$, and T3$_{max}$ using, for example, Formulae (5) to (24).

When the voltage VB is more than N times the voltage VPN (VB>N×VPN), the period determiner 51 causes the minimal period T1$_{min}$ stored in the storage 50 to be the period T1$_{max}$ at the time of regeneration, while at the time of charging, the period determiner 51 causes the minimal period T3$_{min}$ stored in the storage 50 to be the period T3$_{max}$. When the voltage VB is equivalent to or less than N times the voltage VPN (VB≤N×VPN), the period determiner 51 causes the minimal period T3$_{min}$ stored in the storage 50 to be the period T3$_{max}$ at the time of regeneration, while at the time of charging, the period determiner 51 causes the minimal period T1$_{min}$ stored in the storage 50 to be the period T1$_{max}$. This configuration enables the period adjustor 22 to readily obtain the periods T1$_{max}$, T2$_{max}$, and T3$_{max}$.

VB-side power P will be described. While N=1 in the following description, N may not necessarily be 1. When N is other than 1, the VB-side power P can be obtained based on the location of the inductance element 13 and the winding coil ratio N according to the principle described below.

In half the carrier period Tc (hereinafter occasionally referred to as carrier half-cycle), the VB-side power P can be represented using the following general Formula (25). In Formula (25), V(t) and IL(t) respectively indicate the voltage V1 and the current IL at time t and fluctuate in the period of 0≤t≤Tc/2.

$$P = \int (V(t) \times IL(t)) dt / (Tc/2) \quad (25)$$

In the case of regeneration illustrated in FIG. 9, in the period T0 through T3 of the carrier half-cycle, V(t)=0 in the periods T0 and T3, and V(t)=V1 in the periods T1 and T2. In the case of charging illustrated in FIG. 10, V(t)=0 in the periods T0 and T1, and V(t)=V1 in the periods T2 and T3.

In the period T0 through T3, the current IL fluctuates as a function of the voltage VL applied to the inductance element 13. With the equivalent circuit model illustrated in FIG. 5, the voltage VL and the current IL respectively can be represented using the following Formulae (26) and (27) using IL(t), which is the current IL at time t (0≤t≤Tc/2).

$$VL = L \times dIL(t)/dt \quad (26)$$

$$IL = (1/L) \times \int VL \, dt \quad (27)$$

Figure 15:
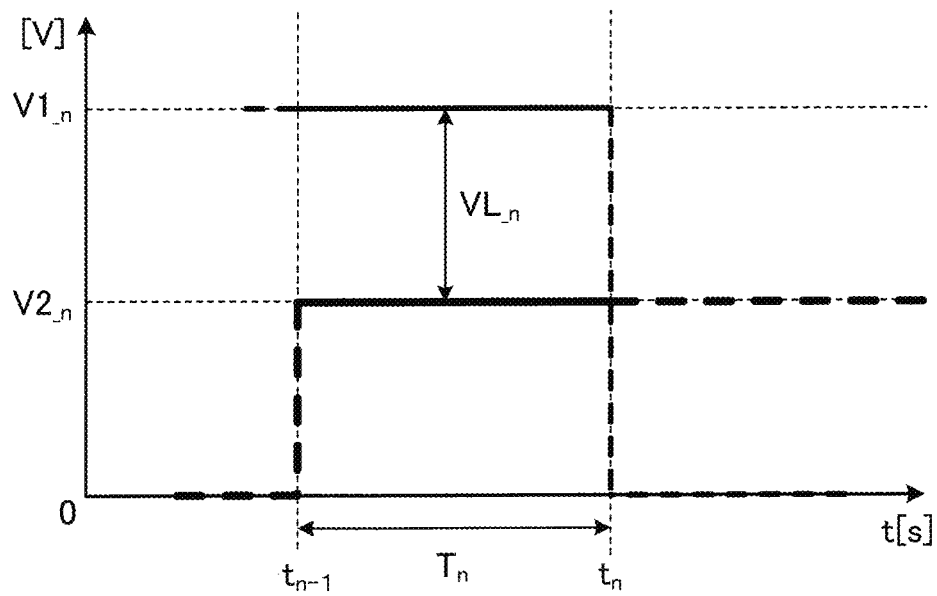
FIG. 15 illustrates a definition of the voltage of the inductance element.

In this respect, the voltage VL in section T$_n$ (n=0, 1, 2, 3) is defined as illustrated in FIG. 15. FIG. 15 illustrates a definition of the voltage VL_$n$ of the inductance element 13. In FIG. 15, the subscript NSERT-2Qn" indicates the period T0, T1, T2, or T3, and V1_$n$, V2_$n$, and VL_$n$ respectively indicate V1, V2, and VL in the period T$_n$.

For example, when n=0, V1_$n$, V2_$n$, and VL_$n$ are respectively V1_$0$, V2_$0$, and VL_$0$, which are respectively V1, V2, and VL in the period T0. VL_$n$ can be represented using the following Formula (28) using V1_$n$ and V2_$n$:

$$VL\_n = V1\_n - V2\_n \quad (28)$$

Figure 16:
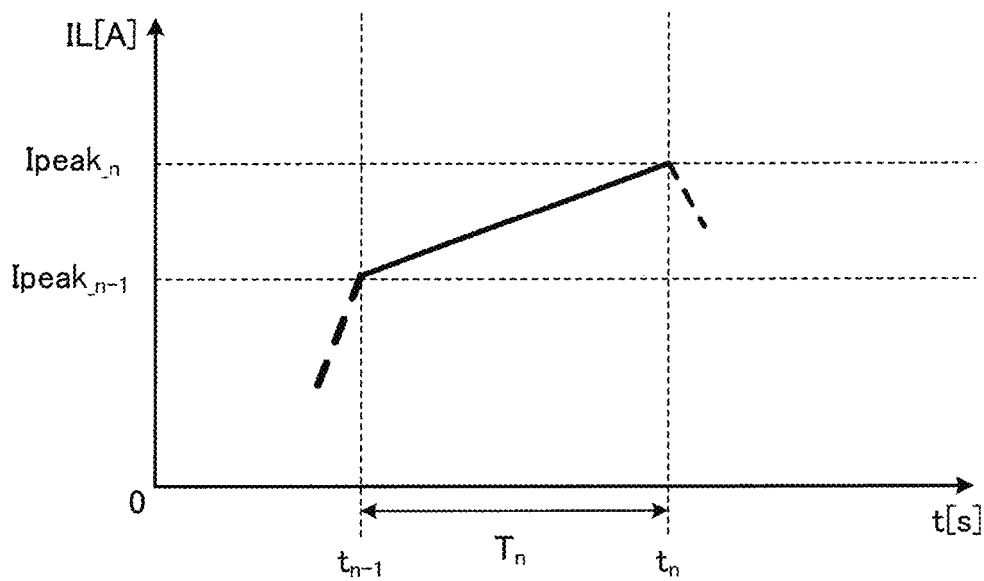
FIG. 16 illustrates a definition of the peak value of the current through the inductance element in each period.

The current IL in each section T$_n$ (n=0, 1, 2, 3) is defined as illustrated in FIG. 16. FIG. 16 illustrates a definition of the peak value Ipeak_$n$ of the current IL through the inductance element 13 in each period T$_n$.

In FIG. 16, the subscript "n" of the period T$_n$ indicates the period T0, T1, T2, or T3, with T$_0$=T0, T$_1$=T1, T$_2$=T2, and T$_3$=T3. Ipeak_$n$ indicates the peak value of the current IL in the period T$_n$, and Ipeak_$n-1$ indicates the peak value of the current IL in the period prior to the period T$_n$. Time t$_{n-1}$ indicates the start time of the period T$_n$, and time t$_n$ indicates the end time of the period T$_n$. In FIG. 16, t$_{-1}$=0.

The peak values Ipeak_$n$ and Ipeak_$n-1$ can be respectively represented using the following Formulae (29) and (30):

$$Ipeak\_n = (VL\_n/L) \times T_n \quad (29)$$

$$Ipeak\_{n+1} = Ipeak\_n + VL\_{n-1}/L \times T_{n+1} \quad (30)$$

At the time of regeneration, V(t)=0 in the periods T0 and T3, as described above. Hence, the VB-side power P in the periods T0 and T3 is zero, as represented by the following Formulae (31) and (32):

$$\int V(t) \times IL(t) dt = 0 \, (0 \le t \le t_0) \quad (31)$$

$$\int V(t) \times IL(t) dt = 0 \, (t_2 \le t \le t_3) \quad (32)$$

From Formulae (31) and (32), the VB-side power P at the time of regeneration can represented using the following Formula (33). In Formula (33), t$_0$ to t$_2$ are respectively denoted t0 to t2.

$$P = \frac{2}{Tc} \times \left\{ \int_{t1}^{t0} VB \times (VB/L) \times t \, dt + \right. \quad (33)$$
$$\int_{t2}^{t1} VB \times (VB/L \times T1 + (VB - VPN)/L \times t) dt =$$
$$\left. \frac{VB}{L \times Tc} \times \{VB \times T1^2 + 2 \times VB \times T1 \times T2 + (VB - VPN) \times T2^2\} \right.$$

From Formula (33), the VB-side power P in maximum modulation (hereinafter occasionally referred to as VB-side power P$_{max}$) can be represented using the following Formula (34). It is noted that the VB-side power P$_{max}$ is input power at the time of regeneration and output power at the time of charging.

$$P\max = \frac{VB \times \{VB \times T1\max^2 + 2 \times VB \times T1\max \times T2\max + (VB - VPN) \times T2\max^2\}}{L \times Tc} \quad (34)$$

At the time of charging, V(t)=0 in the periods T0 and T1. Hence, the VB-side power P in the periods T0 and T1 is zero, as represented by the following Formulae (35) and (36):

$$\int V(t) \times (t) dt = 0 \, (0 \le t \le t_0) \quad (35)$$

$$\int V(t) \times IL(t) dt = 0 \, (t_0 \le t \le t_1) \quad (36)$$

Thus, the VB-side power P at the time of charging can represented using the following Formula (37). In Formula (37), $t_1$ to $t_3$ are respectively denoted t1 to t3.

$$P = \frac{2}{Tc} \times \left\{ \int_{t2}^{t3} VB \times (VB/L) \times t \, dt + \right. \quad (37)$$

$$\int_{t1}^{t2} VB \times (VB/L \times T3 + (VB - VPN)/L \times t) \, dt =$$

$$\frac{VB}{L \times Tc} \times \{VB \times T3^2 + 2 \times VB \times T3 \times T2 + (VB - VPN) \times T2^2\}$$

From Formula (37), the VB-side power $P_{max}$ in maximum modulation can be represented using the following Formula (38):

$$P\max = \frac{VB \times \{VB \times T3\max^2 + 2 \times VB \times T3\max \times T2\max + (VB - VPN) \times T2\max^2\}}{L \times Tc} \quad (38)$$

The reference power calculator 42 uses, for example, Formulae (34) and (38) to obtain the VB-side power $P_{max}$ in maximum modulation. The reference power calculator 42 is capable of obtaining the voltage VB and the voltage VPN from the voltage detectors 17 and 18, and obtaining the carrier period Tc, the winding coil ratio N, and the minimal period $T1_{min}$ from an internal storage of the reference power calculator 42 or from the storage 50.

When N=1 and VB=VPN, the VB-side power $P_{max}$ in maximum modulation is rated power $P_{rate}$. The periods T1 and T3 that satisfy the rated power $P_{rate}$ are $T1_{min}$ and $T3_{min}$, respectively, where $T1_{min}=T3_{min}$. In this case, Formulae (33) and (37) can be represented using the following Formula (39):

$$\frac{Tc}{2} \times P = \int_{t1}^{t0} \{VB \times (VB/L) \times t\} dt + \int_{t2}^{t1} \{VB \times (VB/L) \times T1\} dt = \quad (39)$$

$$\int_{t2}^{t3} \{VB \times (VB/L) \times t\} dt + \int_{t1}^{t2} \{VB \times (VB/L) \times T3\} dt$$

Since $T1_{min}=T3_{min}$, $T2=Tc/2-2\times T1_{min}$. Thus, the minimal periods $T1_{min}$ and $T3_{min}$ can be represented using the following Formula (40):

$$T1\min = T3\min = \frac{2 \times \{(Tc/2)/3\} - \sqrt{2 \times \{(Tc/2)/3\} \times \{2 \times (Tc/2)/3 - 4 \times Prate \times L/(N \times VPN)^2\}}}{2} \quad (40)$$

Thus, the minimal periods $T1_{min}$ and $T3_{min}$ can be obtained using parameters such as the inductance value L of the inductance element 13, the rated power $P_{rate}$ of the DC-to-DC converter 1, the carrier period Tc, and the voltage VPN. For example, when $P_{rate}=11$ [kW], L=33 [µH], Tc=1/18000 [sec], and VB=VPN=400 [V], the minimal periods $T1_{min}$ and $T3_{min}$ are 2.647 [usec], according to Formula (40). The reference period calculator 41 is capable of calculating the minimal periods $T1_{min}$ and $T3_{min}$ using, for example, Formula (40) and storing the obtained minimal periods $T1_{min}$ and $T3_{min}$ in the storage 50 or another storage.

Figure 17:
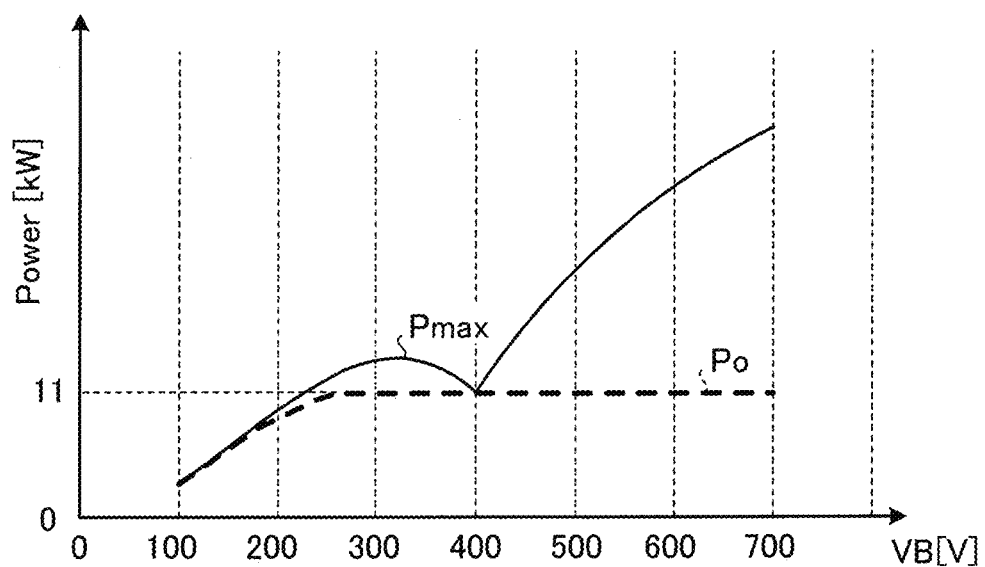
FIG. 17 illustrates an exemplary relationship between input power calculated by a reference power calculator in maximum modulation and power that the DC-to-DC converter is able to output.

FIG. 17 illustrates an exemplary relationship between the VB-side power $P_{max}$ in maximum modulation calculated by the reference power calculator 42 and power $P_o$, which the DC-to-DC converter 1 is able to output.

Referring again to FIG. 3, the period adjustor 22 will be further described. The ratio calculator 43 calculates the ratio $D_{ref}$ based on the VB-side power $P_{max}$ in maximum modulation and the power command $P_{ref}$. For example, the ratio calculator 43 calculates the square root ratio, $D_p$, of the VB-side power $P_{max}$ in maximum modulation and the power command $P_{ref}$ to each other (see Formula (41)), and sets the square root ratio $D_p$ as the ratio $D_{ref}$.

$$D_p = \sqrt{(P_{ref}/P_{max})} \quad (41)$$

The control period calculator 44 calculates the period commands $T1_{ref}$, $T2_{ref}$, and $T3_{ref}$ based on the periods $T1_{max}$, $T2_{max}$, and $T3_{max}$ and based on the ratio $D_{ref}$. For example, the control period calculator 44 performs calculations represented by, for example, Formulae (42) to (44) to obtain the period commands $T1_{ref}$, $T2_{ref}$, and $T3_{ref}$.

$$T1_{ref} = T1_{max} \times D_{ref} \quad (42)$$

$$T2_{ref} = T2_{max} \times D_{ref} \quad (43)$$

$$T3_{ref} = T3_{max} \times D_{ref} \quad (44)$$

Figure 18:
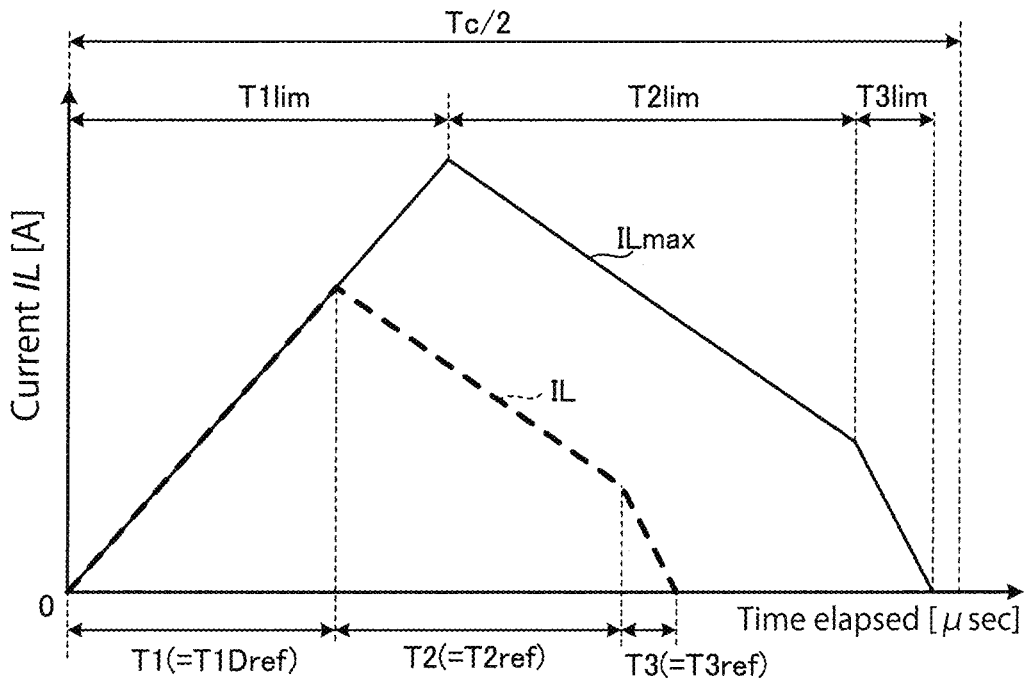
FIG. 18 illustrates an example of current that flows through a reactance element at VB<N×VPN.
Figure 19:
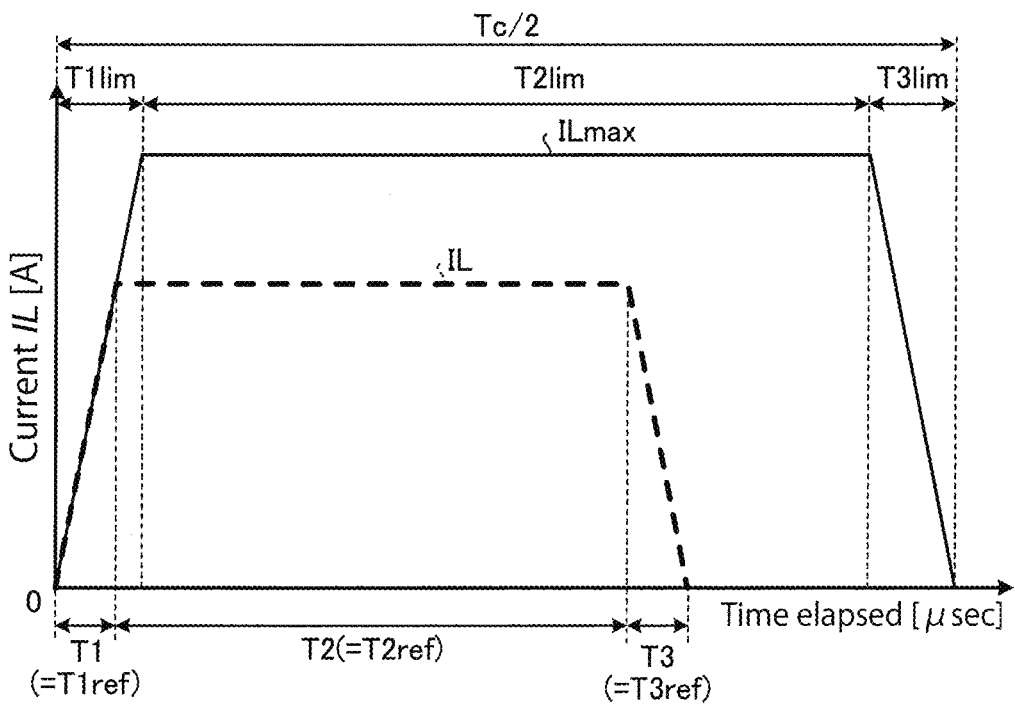
FIG. 19 illustrates an example of current that flows through the reactance element at VB=N×VPN.
Figure 20:
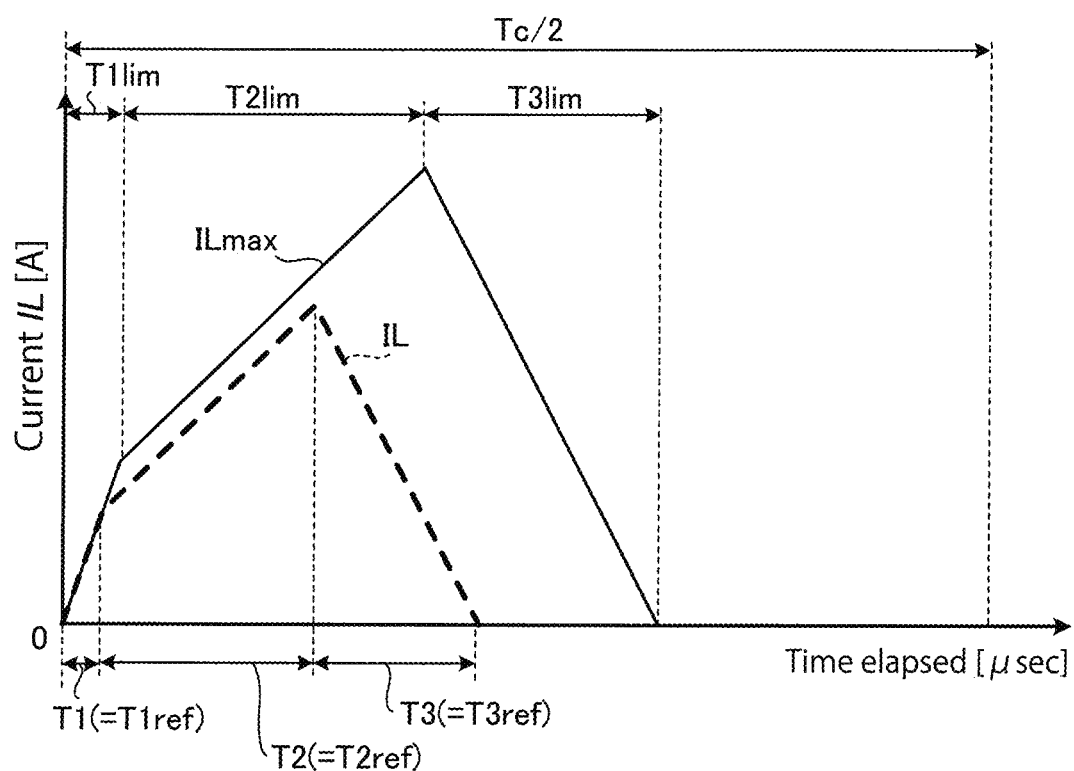
FIG. 20 illustrates an example of current that flows through the reactance element at VB≥N×VPN.

FIG. 18 illustrates an example of the current IL at VB<N×VPN. FIG. 19 illustrates an example of the current IL at VB=N×VPN. FIG. 20 illustrates an example of the current IL at VB>N×VPN. As illustrated in FIGS. 18 to 20, current $IL_{max}$ indicates the current IL flowing through the inductance element 13 when the power command $P_{ref}$ is equivalent to the rated power $P_{rate}$ of the DC-to-DC converter 1 (in the example illustrated in FIG. 17, 11 kW). Also as illustrated in FIGS. 18 to 20, periods $T1_{lim}$ to $T3_{lim}$ respectively indicate the periods T1, T2, and T3 that are in the case where the power command $P_{ref}$ is equivalent to the rated power $P_{rate}$ of the DC-to-DC converter 1.

In the manners illustrated in FIGS. 18 to 20, the period adjustor 22 sets the ratio of the periods T1, T2, and T3 to each other based on the ratio of the periods $T1_{max}$, $T2_{max}$, and $T3_{max}$ to each other, and adjusts the periods T1, T2, and T3 based on the power command $P_{ref}$. This configuration enables the period adjustor 22 to readily obtain the periods T1, T2, and T3, without complicated calculations, while minimizing the current flowing through the transformer 12.

In maximum modulation, the period adjustor 22 calculates the periods $T1_{max}$, $T2_{max}$, and $T3_{max}$ to elongate the second period T2. This configuration enables the period adjustor 22 to minimize the current flowing through the transformer 12 more effectively in cases of higher levels of input power or output power.

The period adjustor 22 also calculates the periods $T1_{max}$, $T2_{max}$, and $T3_{max}$ based on the voltage VB and the voltage VPN. This configuration enables the period adjustor 22 to appropriately eliminate or minimize degradation of power conversion efficiency in the DC-to-DC converter 1 even when the voltage VB and the voltage VPN have changed.

The period adjustor 22 also calculates the square root ratio $D_p$ of the VB-side power $P_{max}$ in maximum modulation and the power command $P_{ref}$ to each other, and multiplies the square root ratio $D_p$ by the periods $T1_{max}$, $T2_{max}$, and $T3_{max}$ to obtain the periods T1, T2, and T3. This configuration enables the period adjustor 22 to calculate with improved accuracy the operation periods of the first switching circuit 10 and the second switching circuit 11 based on the power command $P_{ref}$.

2.5. Switch Driver 23

The switch driver 23 generates drive signals S1 to S8 based on the period commands $T1_{ref}$, $T2_{ref}$, and $T3_{ref}$ generated by the period adjustor 22 to on-off control the switching elements Q1 to Q8 of the first switching circuit 10 and the second switching circuit 11.

For example, in controlling the first switching circuit 10 and the second switching circuit 11, the switch driver 23 generates the drive signals S1 to S8 to make the periods T1, T2, and T3 respectively coincide with the period commands $T1_{ref}$, $T2_{ref}$, and $T3_{ref}$.

2.6. DC-to-DC Conversion

Figure 21:
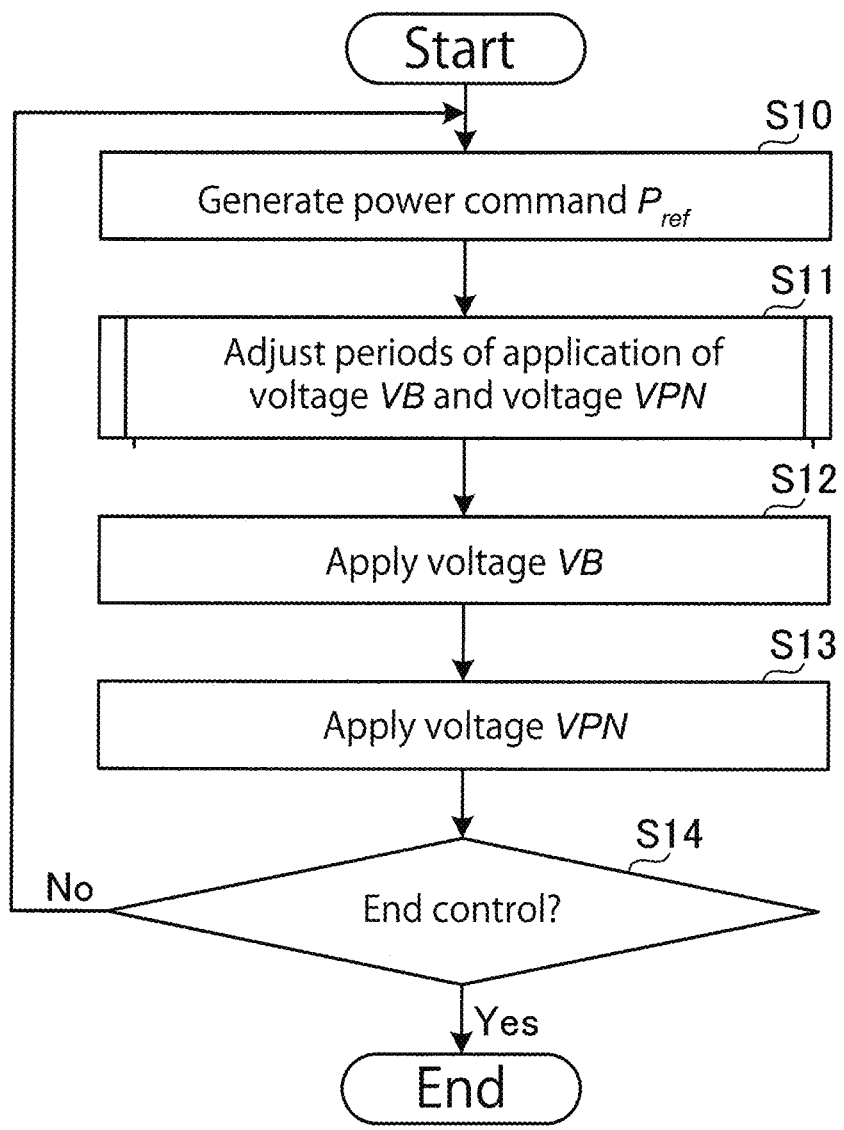
FIG. 21 is a flowchart of DC-to-DC conversion processing performed by the DC-to-DC converter.

Next, DC-to-DC conversion processing performed by the DC-to-DC converter 1 will be described. FIG. 21 is a flowchart of DC-to-DC conversion processing performed by the DC-to-DC converter 1. The DC-to-DC conversion processing illustrated in FIG. 21 is repeated by the DC-to-DC converter 1.

As illustrated in FIG. 21, the controller 20 of the DC-to-DC converter 1 generates the power command $P_{ref}$ to, for example, maximize the supplied power PB from the power generator 4 (step S10).

Based on the voltage VB and the voltage VPN, the controller 20 generates the period commands $T1_{ref}$, $T2_{ref}$, and $T3_{ref}$, and adjusts the periods of application of the voltage VB (which is a non-limiting example of one of the first voltage and second voltage recited in the appended claims) and the voltage VPN (which is a non-limiting example of the another one of the first voltage and second voltage recited in the appended claims) (step S11). The period of application of the voltage VB is a period of time for which the voltage VB is applied from the first switching circuit 10 to the AC side. The period of application of the voltage VPN is a period of time for which the voltage VPN is applied from the second switching circuit 11 to the AC side.

The controller 20 causes the first switching circuit 10 to operate for a period of time corresponding to the period commands $T1_{ref}$ and $T2_{ref}$ so as to cause the first switching circuit 10 to apply the voltage VB to the series circuit made up of the inductance element 13 and the primary winding coil of the transformer 12 (step S12).

The controller 20 also causes the second switching circuit 11 to operate for a period of time corresponding to the period commands $T2_{ref}$ and $T3_{ref}$ so as to cause the second switching circuit 11 to apply the voltage VPN to the secondary winding coil of the transformer 12 (step S13).

After completion of step S13, the controller 20 determines whether to end the control processing illustrated in FIG. 21 (step S14). For example, when a stop command has been input from an operation section, not illustrated, the controller 20 determines to end the control processing illustrated in FIG. 21. When the controller 20 has determined to end the control processing illustrated in FIG. 21 (Yes at step S14), the controller 20 ends the control. When the controller 20 has determined not to end the control processing illustrated in FIG. 21 (No at step S14), the controller 20 moves to step S10.

Steps S12 and S13 are cases where the power conversion direction is the regeneration direction. When the power conversion direction is the charging direction, the controller 20, at step S12, causes the second switching circuit 11 to operate for a period of time corresponding to the period commands $T1_{ref}$ and $T2_{ref}$ so as to cause the voltage VPN to be applied to the secondary winding coil of the transformer 12. At step S13, the controller 20 causes the first switching circuit 10 to operate for a period of time corresponding to the period commands $T2_{ref}$ and $T3_{ref}$ so as to cause the voltage VB to be applied to the inductance element 13 and the primary winding coil of the transformer 12, which are connected in series to each other.

Figure 22:
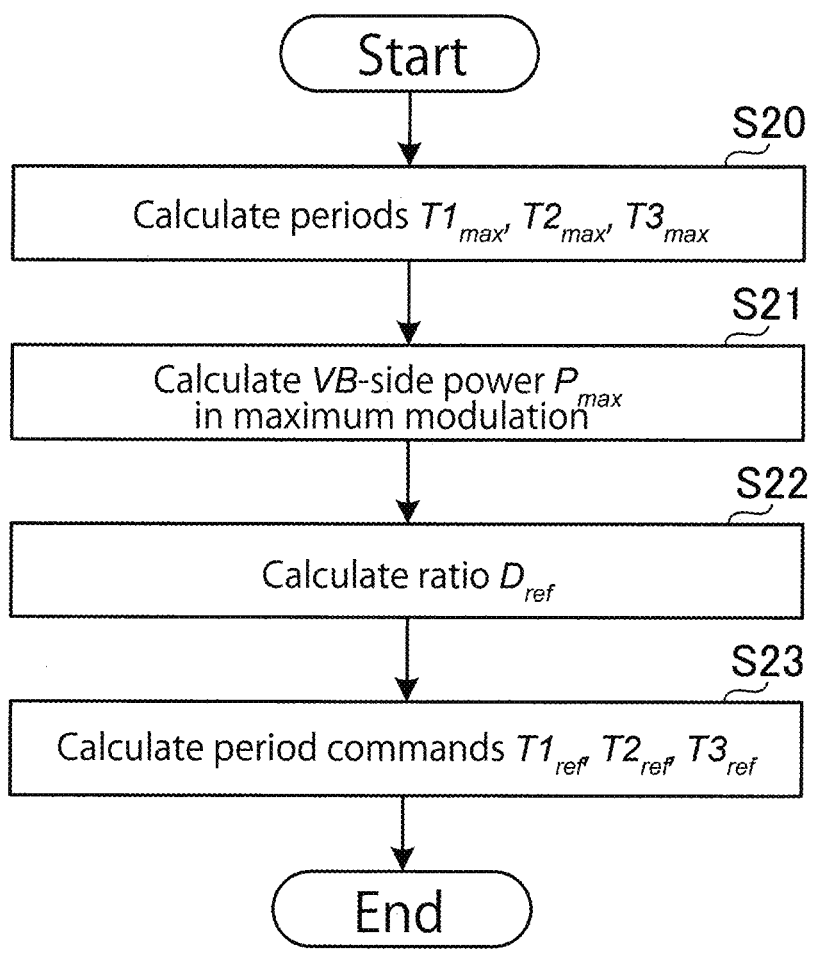
FIG. 22 is a flowchart of step S11 illustrated in FIG. 21.

FIG. 22 is a flowchart of step S11 illustrated in FIG. 21. As illustrated in FIG. 22, the controller 20 calculates the periods $T1_{max}$, $T2_{max}$, and $T3_{max}$ based on, for example, the voltage VB and the voltage VPN (step S20).

Next, the controller 20 calculates the VB-side power $P_{max}$ in maximum modulation based on the periods $T1_{max}$ and $T2_{max}$, or based on the periods $T2_{max}$ and $T3_{max}$ (step S21). Then, the controller 20 calculates the ratio $D_{ref}$ based on the VB-side power $P_{max}$ in maximum modulation and based on the power command $P_{ref}$ (step S22). Next, the controller 20 multiplies the periods $T1_{max}$, $T2_{max}$, and $T3_{max}$ by the ratio $D_{ref}$ to calculate the period commands $T1_{ref}$, $T2_{ref}$, and $T3_{ref}$ (step S23).

The DC-to-DC converter 1 according to this embodiment includes first means for applying a first voltage, second means for applying a second voltage, and third means for adjusting the periods of application of the first voltage and the second voltage. The first means applies a first voltage (which is a non-limiting example of the first voltage recited in the appended claims) to the primary winding coil (which is non-limiting example of the first winding coil recited in the appended claims) of the transformer 12. The second means applies a second voltage (which is a non-limiting example of the second voltage recited in the appended claims) to the secondary winding coil (which is non-limiting example of the second winding coil recited in the appended claims) of the transformer 12 for a period between a point of time during application of the first voltage and a point of time after the application of the first voltage by the first means. At least one of the first voltage and the second voltage is applied through the inductance element 13. Based on a reference ratio that is set between a first application period of the first voltage applied by the first means and a second application period of the second voltage applied by the second means and that is based on reference input power or reference output power, the third means sets a non-reference ratio of the first application period of the first voltage and the second application period of the second voltage to each other. The non-reference ratio is based on non-reference power different from the reference input power or the reference output power.

3. Other Embodiments

In the above-described embodiment, the period adjustor 22 illustrated in FIG. 3 uses input power as the reference power. In another possible embodiment, the period adjustor 22 may use output power as the reference power. In the case of output power, similarly to the case of input power, the period determiner 51 of the period adjustor 22 calculates the minimal periods $T1_{min}$ and $T3_{min}$ that satisfy the rated power $P_{rate}$ to ensure that T1=T3 in, for example, maximum modulation and that the second period T2 is longest among the first period T1, the second period T2, and the third period T3. The minimal periods $T1_{min}$ and $T3_{min}$ can be obtained in a manner similar to Formula (40), using parameters such as the inductance value L, the rated power $P_{rate}$, the carrier period Tc, the voltage VPN, and the voltage VB. In this case, the rated power $P_{rate}$ is the maximum rated power that the DC-to-DC converter 1 is able to output. The reference power calculator 42 performs calculations represented by Formulae (34) to (38) with the VPN-side power in maximum modulation set at $P_{max}$ (hereinafter occasionally referred to as VPN-side power $P_{max}$), and the ratio calculator 43 calculates the ratio $D_{ref}$ based on the VPN-side power $P_{max}$ in maximum modulation and the power command $P_{ref}$. In this case, the power command $P_{ref}$ is an output power command that is generated by the command generator 21 at the time of regeneration to, for example, maximize the supplied power PB.

In the above-described embodiment, when VB=N×VPN, the period adjustor 22 illustrated in FIG. 3 obtains the minimal periods $T1_{min}$ and $T3_{min}$ to maximize the second period T2. In another possible embodiment, the period adjustor 22 may obtain the minimal periods $T1_{min}$ and $T3_{min}$ to maximize the second period T2 when VB is not equivalent to N×VPN. In another possible embodiment, when the change rate of the current IL is smallest in the first period T1, the period adjustor 22 may obtain the minimal periods $T2_{min}$ and $T3_{min}$ to maximize the first period T1, and calculate the periods $T1_{max}$, $T2_{max}$, and $T3_{max}$ based on the minimal periods $T2_{min}$ and $T3_{min}$.

In the above-described embodiment, the period adjustor 22 uses the VB-side power $P_{max}$ in maximum modulation and the VPN-side power $P_{max}$ in maximum modulation as the reference power. In another possible embodiment, the period adjustor 22 may use power other than the VB-side power $P_{max}$ in maximum modulation or other than the VPN-side power $P_{max}$ in maximum modulation as the reference power. The reference power encompasses power that is based on voltage alone and power that is based on current alone.

In the above-described embodiment, the controller 20 calculates the ratio $D_{ref}$ based on the VB-side power $P_{max}$ in maximum modulation and the power command $P_{ref}$ illustrated in FIG. 3. In another possible embodiment, the controller 20 may calculate the ratio $D_{ref}$ based on the output of the command generator 21 alone. In this case, the reference power calculator 42 and the ratio calculator 43 may not necessarily be provided. Without the reference power calculator 42 and the ratio calculator 43, the command generator 21 obtains the ratio $D_{ref}$ (which is a non-limiting example of the power command recited in the appended claims) by controlling the voltage difference between the DC voltage command $VB_{ref}$ and the voltage VB to be zero.

In the above-described embodiment, the DC-to-DC converter 1 performs DC-to-DC conversion using single-phase AC voltage. In another possible embodiment, the DC-to-DC converter 1 may perform DC-to-DC conversion using three-phase AC voltage. In the embodiment where the DC-to-DC converter 1 performs DC-to-DC conversion using three-phase AC voltage, the DC-to-DC converter 1 includes an inductance element for each phase and includes a first switching circuit and a second switching circuit for each inductance element. The first switching circuit and the second switching circuit each may be a half bridge circuit of a pair of switching elements connected in series to each other.

Obviously, numerous modifications and variations of the present disclosure are possible in light of the above teachings. It is therefore to be understood that within the scope of the appended claims, the present disclosure may be practiced otherwise than as specifically described herein.

The invention claimed is:

1. A DC-to-DC converter, comprising:
   a first switching circuit;
   a second switching circuit;
   a transformer positioned between an AC side of the first switching circuit and an AC side of the second switching circuit;
   an inductance element positioned between the transformer and at least one of the AC side of the first switching circuit and the AC side of the second switching circuit; and
   control circuitry configured to operate the first switching circuit and the second switching circuit,
   wherein the control circuitry is configured to set a predetermined operation ratio of the first switching circuit and the second switching circuit to each other, and adjust, based on the predetermined operation ratio, a first operation period of the first switching circuit and a second operation period of the second switching circuit.

2. The DC-to-DC converter according to claim 1, wherein the control circuitry is further configured to set the predetermined operation ratio based on reference power that is input from one of the first switching circuit and the second switching circuit or on reference power that is output from one of the first switching circuit and the second switching circuit.

3. The DC-to-DC converter according to claim 2, wherein the control circuitry is further configured to set a non-reference operation ratio of the first switching circuit and the second switching circuit to each other based on the predetermined operation ratio and based on non-reference power that is different from the reference power and that is input into one of the first and second switching circuits or is output from one of the first and second switching circuits, and adjust the first operation period of the first switching circuit and the second operation period of the second switching circuit based on the non-reference operation ratio.

4. The DC-to-DC converter according to claim 3, wherein the control circuitry is further configured to calculate a first reference operation period of the first switching circuit and a second reference operation period of the second switching circuit based on the reference power input into or output from one of the first switching circuit and the second switching circuit, and change the first reference operation period and the second reference operation period based on a ratio specified by a power command to make the first operation period of the first switching circuit and the second operation period of the second switching circuit compliant with the power command.

5. The DC-to-DC converter according to claim 4, wherein the control circuitry is further configured to calculate a square root ratio of the reference power and the power command to each other, and multiply the first and second reference operation periods of the first switching circuit and the second switching circuit, respectively, by the square root ratio calculated to obtain the first operation period of the first switching circuit and the second operation period of the second switching circuit.

6. The DC-to-DC converter according to claim 5, wherein the operation ratio of the first switching circuit and the second switching circuit to each other, corresponds to a ratio of a first period, a second period, and a third period to each other, the first period being a period in which one of the first switching circuit and the second switching circuit, operate, the second period being a period in which the first switching circuit and the second switching circuit, operate, and the third period being a period in which one of the first switching circuit and the second switching circuit, operate, and the control circuitry is configured to cause a reference ratio of the first period, the second period, and the third period to each other, that is based on the reference power input into or output from the first switching circuit and the second switching circuit, to be same as another ratio of the first period, the second period, and the third period to each other, that is based on different power, the different power being different from the reference power and being input into or output from the first switching circuit and the second switching circuit, and adjust the first period, the second period, and the third period based on the resulting ratio.

7. The DC-to-DC converter according to claim 6, wherein when the reference power is input into or output from the first switching circuit and the second switching circuit, the first period, the second period, and the third period are respectively initialized as a first reference operation period, a second reference operation period, and a third reference operation period, and the control circuitry is further configured to calculate the first reference operation period, the second reference operation period, and the third reference operation period based on a first voltage at a DC side of the first switching circuit and based on a second voltage at a DC side of the second switching circuit.

8. The DC-to-DC converter according to claim 7, wherein the transformer comprises a first winding coil at a first side of the transformer closest to the first switching circuit, and a second winding coil at a second side of the transformer closest to the second switching circuit, the first winding coil and the second winding coil comprising a winding coil ratio of N:1, and the control circuitry is further configured to instruct storage of a minimal value of the first period and a minimal value of the third period, and determine the minimal value of the first period as the first reference operation period when the first voltage is more than N times the second voltage, and determine the minimal value of the third period as the third reference operation period when the first voltage is less than N times the second voltage.

9. The DC-to-DC converter according to claim 3, wherein the operation ratio of the first switching circuit and the second switching circuit to each other, corresponds to a ratio of a first period, a second period, and a third period to each other, the first period being a period in which one of the first switching circuit and the second switching circuit, operate, the second period being a period in which the first switching circuit and the second switching circuit operate, and the third period being a period in which the one of the first switching circuit and the second switching circuit, operate, and the control circuitry is configured to cause a reference ratio of the first period, the second period, and the third period to each other, that is based on the reference power input into or output from the first switching circuit and the second switching circuit, to be same as a non-reference ratio of the first period, the second period, and the third period to each other, that is based on non-reference power, the non-reference power being different from the reference power and being input into or output from the first switching circuit and the second switching circuit, and adjust the first period, the second period, and the third period based on a resulting reference ratio.

10. The DC-to-DC converter according to claim 9, wherein the control circuitry is further configured to determine the first period, the second period, and the third period as a first reference operation period, a second reference operation period, and a third reference operation period, respectively, when the reference power is input into or output from the first switching circuit and the second switching circuit, and obtain the first reference operation period, the second reference operation period, and the third reference operation period based on a first voltage at a DC side of the first switching circuit and based on a second voltage at a DC side of the second switching circuit.

11. The DC-to-DC converter according to claim 10, wherein the control circuitry is configured to determine the second reference operation period to make the second period longest from a group including the first period, the second period, and the third period, when the reference power is input into or output from the first switching circuit and the second switching circuit.

12. The DC-to-DC converter according to claim 10, wherein the transformer comprises a first winding coil at a first side of the transformer closest to the first switching circuit, and a second winding coil at a second side of the transformer closest to the second switching circuit, the first winding coil and the second winding coil comprising a winding coil ratio of N:1, and the control circuitry is further configured to instruct storage of a minimal value of the first period and a minimal value of the third period, determine the minimal value of the first period as the first reference operation period when the first voltage is more than N times the second voltage, and determine the minimal value of the third period as the third reference operation period when the first voltage is less than N times the second voltage.

13. The DC-to-DC converter according to claim 12, wherein the control circuitry is further configured to determine the second reference operation period to make the second period longest among the first period, the second period, and the third period when the reference power is input into or output from the first switching circuit and the second switching circuit.

14. The DC-to-DC converter according to claim 4, wherein the operation ratio of the first switching circuit and the second switching circuit to each other, corresponds to a ratio of a first period, a second period, and a third period to each other, the first period being a period in which one of the first switching circuit and the second switching circuit, operate, the second period being a period in which the first switching circuit and the second switching circuit, operate, and the third period being a period in which one of the first switching circuit and the second switching circuit, operate, and the control circuitry is configured to cause a reference ratio of the first period, the second period, and the third period to each other, that is based on the reference power input into or output from the first switching circuit and the second switching circuit, to be same as another ratio of the first period, the second period, and the third period to each other, that is based on different power, the different power being different from the reference power and being input into or output from the first switching circuit and the second switching circuit, and adjust the first period, the second period, and the third period based on the resulting reference ratio.

15. The DC-to-DC converter according to claim 14, wherein when the reference power is input into or output from the first switching circuit and the second switching circuit, the first period, the second period, and the third period are respectively initialized as a first reference operation period, a second reference operation period, and a third reference operation period, and the control circuitry is further configured to calculate the first reference operation period, the second reference operation period, and the third reference operation period based on a first voltage at a DC side of the first switching circuit and based on a second voltage at a DC side of the second switching circuit.

16. The DC-to-DC converter according to claim 15, wherein the transformer comprises a first winding coil at a first side of the transformer closest to the first switching circuit, and a second winding coil at a second side of the transformer closest to the second switching circuit, the first winding coil and the second winding coil comprising a winding coil ratio of N:1, and the control circuitry is further configured to instruct storage of a minimal value of the first period and a minimal value of the third period, determine the minimal value of the first period as the first reference operation period when the first voltage is more than N times the second voltage, and determine the minimal value of the third period as the third reference operation period when the first voltage is less than N times the second voltage.

17. The DC-to-DC converter according to claim 2, wherein the reference power comprises input power or output power at modulation time.

18. A power converter, comprising:
a DC-to-DC converter including a first switching circuit, a second switching circuit, a transformer positioned between an AC side of the first switching circuit and an AC side of the second switching circuit, an inductance element positioned between the transformer and at least one of the AC side of the first switching circuit and the AC side of the second switching circuit, and control circuitry configured to operate the first switching circuit and the second switching circuit,
wherein the control circuitry configured to set a predetermined operation ratio of the first switching circuit and the second switching circuit to each other, and adjust, based on the predetermined operation ratio, a first operation period of the first switching circuit and a second operation period of the second switching circuit.

19. A power generation system, comprising:
a DC-to-DC converter including a first switching circuit, a second switching circuit, a transformer positioned between an AC side of the first switching circuit and an AC side of the second switching circuit, an inductance element positioned between the transformer and at least of the AC side of the first switching circuit and the AC side of the second switching circuit, and control circuitry configured to operate the first switching circuit and the second switching circuit;
a power generator connected to a DC side of the first switching circuit; and
a DC-to-AC converter connected to a DC side of the second switching circuit,
wherein the control circuitry configured to set a predetermined operation ratio of the first switching circuit and the second switching circuit to each other, and adjust, based on the predetermined operation ratio, a first operation period of the first switching circuit and a second operation period of the second switching circuit.

20. A method for DC-to-DC conversion, comprising:
applying a first voltage to a first winding coil of a transformer;
applying a second voltage to a second winding coil of the transformer for a period between a first point of time during application of the first voltage and a second point of time after the application of the first voltage, at least one of the first voltage and the second voltage being applied through an inductance element; and
setting, based on a reference ratio that is set between a first application period of the first voltage and a second application period of the second voltage and that is based on reference input power or reference output power, a non-reference ratio between the first application period of the first voltage and the second application period of the second voltage, the non-reference ratio being based on non-reference power different from the reference input power or the reference output power.

\* \* \* \* \*